United States Patent

Takagi et al.

[11] Patent Number: 5,614,970
[45] Date of Patent: Mar. 25, 1997

[54] FLASH LIGHTING APPARATUS AND A CAMERA EQUIPPED WITH THE FLASH LIGHTING APPARATUS

[75] Inventors: Tadao Takagi, Yokohama; Takatoshi Ashizawa, Kawasaki, both of Japan

[73] Assignee: Nikon Corporation, Tokyo, Japan

[21] Appl. No.: 462,543

[22] Filed: Jun. 5, 1995

Related U.S. Application Data

[63] Continuation of Ser. No. 392,402, Feb. 22, 1995, abandoned, which is a continuation of Ser. No. 145,666, Nov. 4, 1993, abandoned, which is a continuation of Ser. No. 891,158, May 29, 1992, abandoned.

[30] Foreign Application Priority Data

| Jun. 3, 1991 | [JP] | Japan | 3-160141 |
| Oct. 9, 1991 | [JP] | Japan | 3-290767 |
| Dec. 19, 1991 | [JP] | Japan | 3-336960 |

[51] Int. Cl.⁶ .......................... G03B 15/03; G03B 9/70
[52] U.S. Cl. ................ 396/164; 396/175; 396/198
[58] Field of Search .................... 354/149.1, 149.11, 354/145.1, 413, 410, 414, 420, 483, 432, 138, 415, 416; 362/16, 17, 18; 315/241 P

[56] References Cited

U.S. PATENT DOCUMENTS

| 4,047,194 | 9/1977 | Nakamura et al. | 354/149 |
| 4,100,590 | 7/1978 | Wagensonner | 362/16 |
| 4,228,381 | 10/1980 | Hasegawa | 315/151 |
| 4,256,372 | 3/1981 | Yasukishi et al. | 354/227 |
| 4,325,621 | 4/1982 | Iwata et al. | 354/145 |
| 4,423,940 | 1/1984 | Kashihara et al. | 354/149.1 |
| 4,494,847 | 1/1985 | Yamada | 354/403 |
| 4,570,204 | 2/1986 | Caimi | 362/17 |
| 4,615,599 | 10/1986 | Kataoka et al. | 354/415 |
| 4,652,090 | 3/1987 | Uchikawa et al. | 350/357 |
| 4,941,009 | 7/1990 | Yoshida | 354/414 |
| 4,985,816 | 1/1991 | Suko et al. | 362/303 |
| 5,019,853 | 5/1991 | Sato et al. | 354/420 |
| 5,126,778 | 6/1992 | Wheeler et al. | 354/414 |
| 5,315,342 | 5/1994 | Cocca | 354/403 |

FOREIGN PATENT DOCUMENTS

| 59-6474 | 2/1984 | Japan . |
| 63-115148 | 5/1988 | Japan . |
| 1-108538 | 4/1989 | Japan . |
| 2-138719 | 11/1990 | Japan . |

*Primary Examiner*—Safet Metjahic
*Assistant Examiner*—Nicholas J. Tuccillo
*Attorney, Agent, or Firm*—Shapiro and Shapiro

[57] ABSTRACT

A flash lighting apparatus is capable of controlling the orientational distribution at the time of flashing in accordance with the spatially distributional state of subjects. The flash lighting apparatus comprises a light emission portion, and a light amount adjusting device which is arranged in front of the light emission portion and has a plurality of emission areas corresponding to irradiation areas, and adjusts the amounts of light emitted from the plural emission areas to be the values suitable for the corresponding irradiation areas.

23 Claims, 25 Drawing Sheets

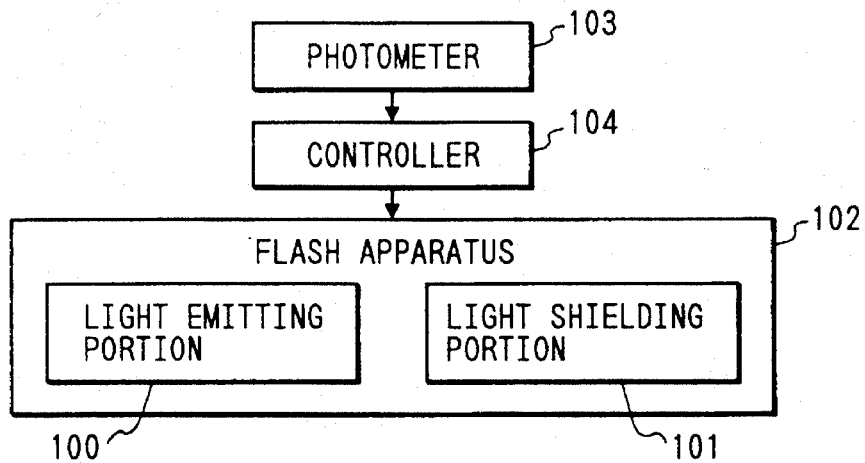
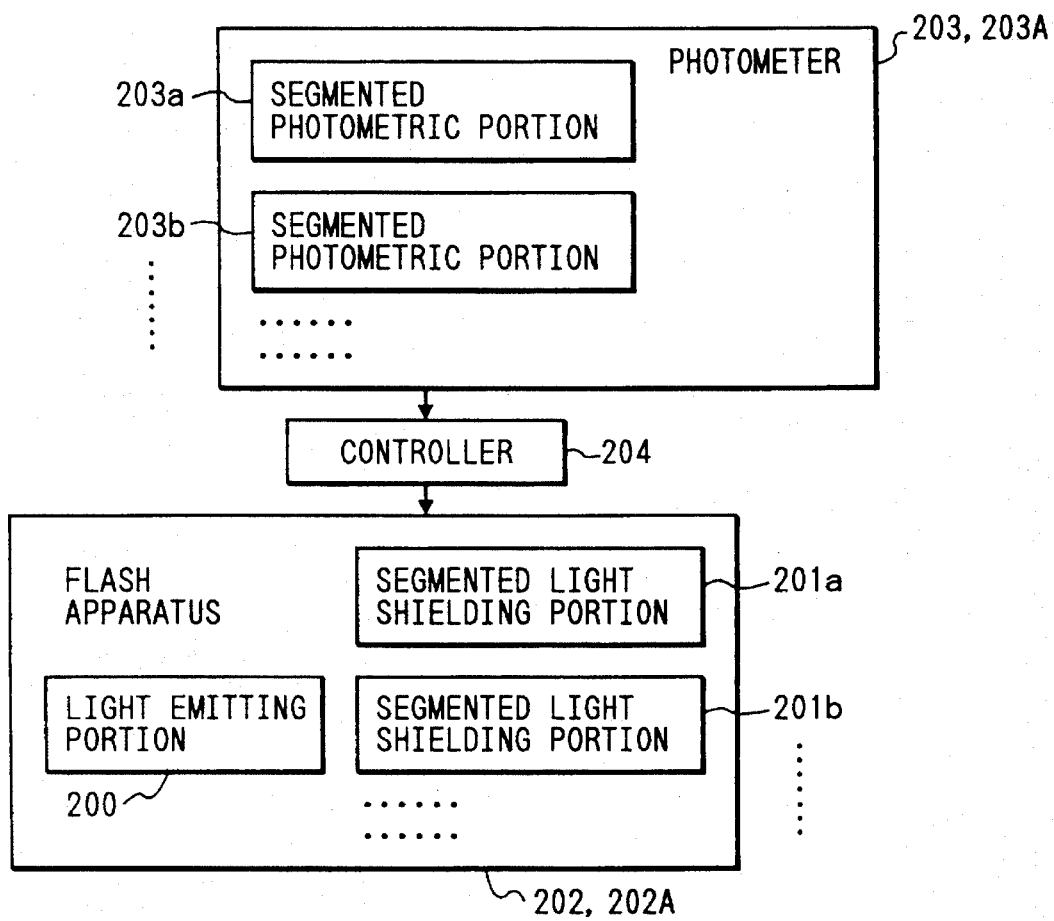

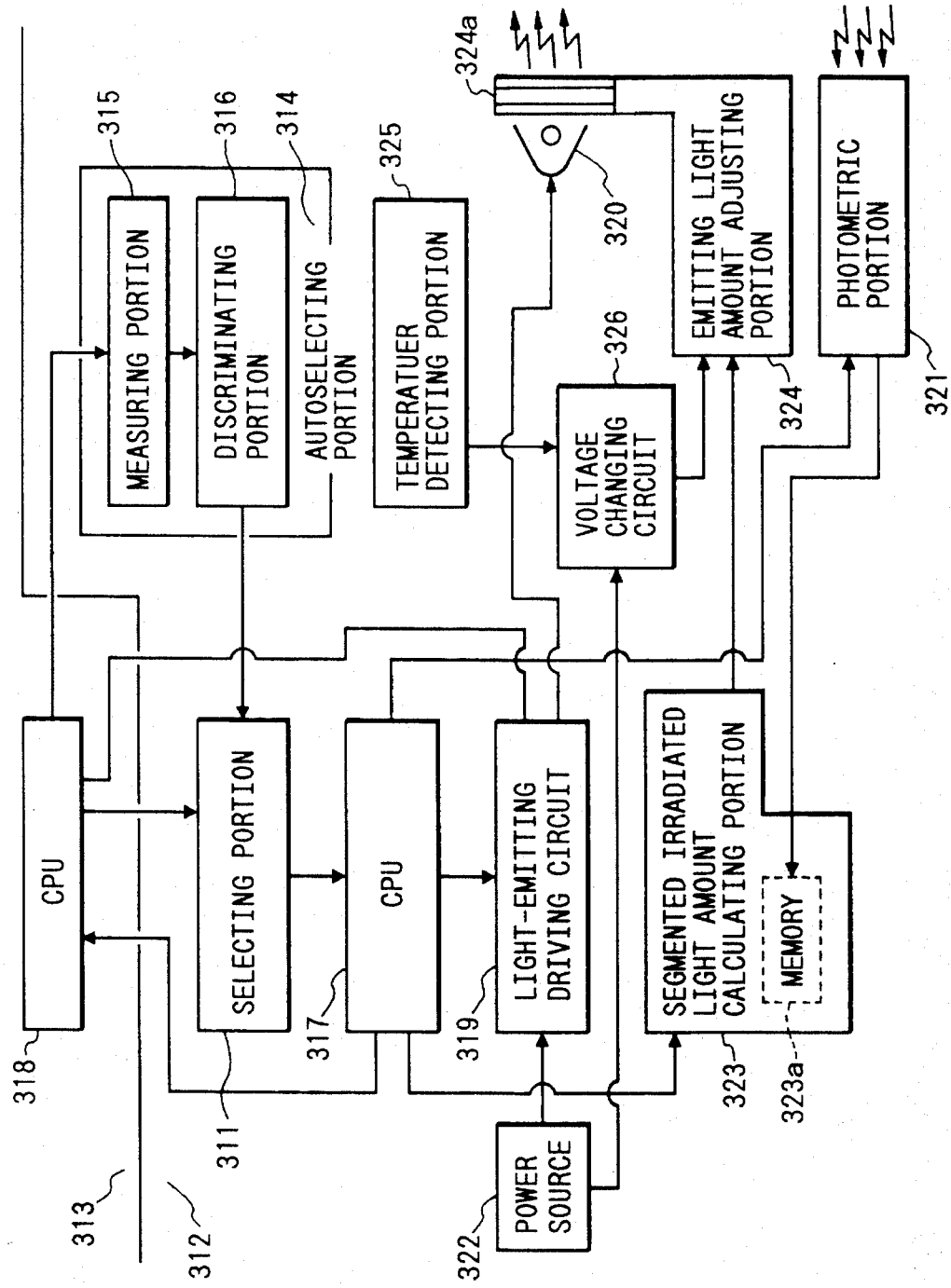

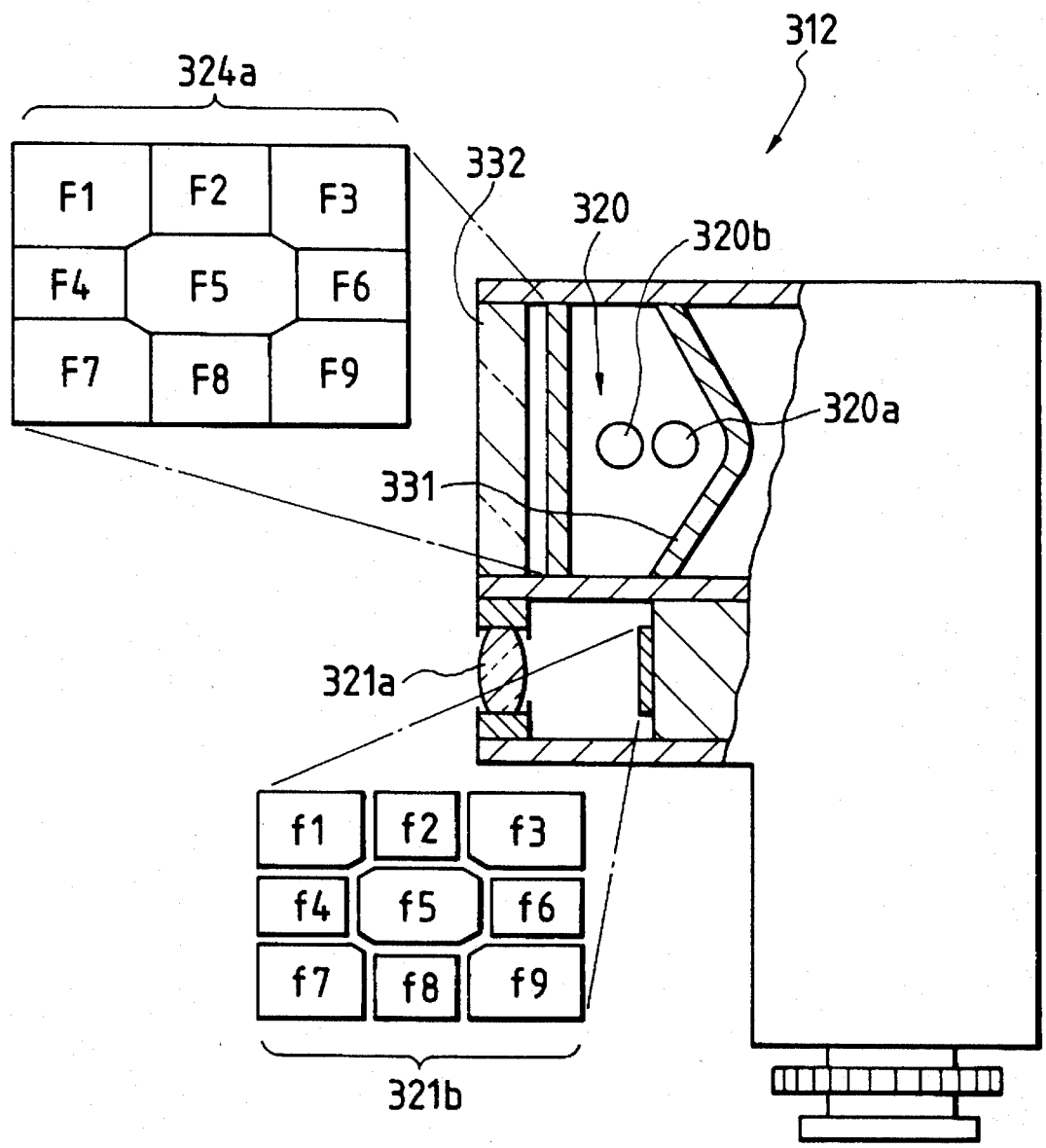

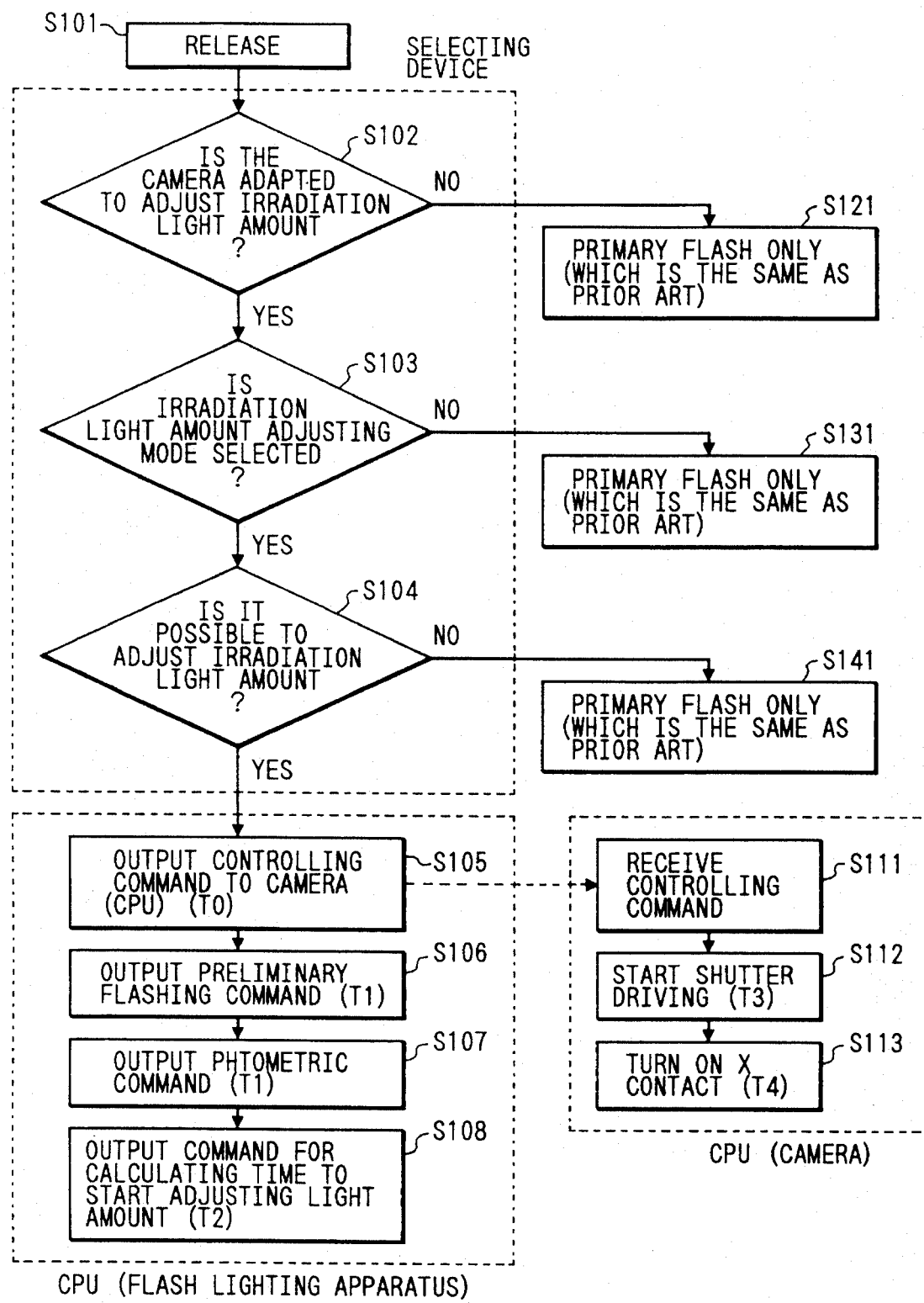

FLASH LIGHTING APPARATUS AND A CAMERA EQUIPPED WITH THE FLASH LIGHTING APPARATUS

This is a continuation of application Ser. No. 08/392,402 filed Feb. 22, 1995, which is a continuation of application Ser. No. 08/145,666 filed Nov. 4, 1993, which is a continuation of application Ser. No. 07/891,158 filed May 29, 1992, all of which are now abandoned.

BACKGROUND OF THE INVENTION

1. Field of the Invention

The present invention relates to a flash lighting apparatus capable of controlling the light orientational distribution at the time of flash emission in accordance with the spatially distributional state of subjects, and a camera equipped with the flash lighting apparatus.

2. Related Background Art

Traditionally, when there is not enough illuminance for a subject for taking its photography, a flash lighting apparatus is used to emit a flash light to compensate for the illuminance for the subject.

With a flash by the flash lighting apparatus, a field can be irradiated substantially evenly, and simultaneously, using a TTL adjustment, the flash irradiation amount can be adjusted. Consequently, if the film-to-subject distances are all the same for the subjects in a field, it is possible to take a flash photography with a correct exposure.

Nevertheless, since the flash lighting apparatus irradiates a field evenly, it is impossible to perform a flash photography for all the subjects with a correct exposure if a plurality of subjects are present with different film-to-subject distances in the field as shown in FIG. 1. In other words, a subject in front is in an over-exposure while a subject in the rear is in an under-exposure.

In order to solve this problem, there has been proposed a flash lighting apparatus in which a plurality of flash emission portions are provided to adjust the irradiation amount of each of the light emission portions in accordance with the film-to-subject distances to the respective subjects (as disclosed in Japanese Patent Laid-Open Application No. 1-108538, for example).

However, the above-mentioned flash lighting apparatus is provided with a plurality of flash emission portions. Thus, there is a problem that its mechanical structure is not only complicated, but its mechanism also becomes complicated because each of the light emission portions should be interlocked to make the angles of irradiation changeable.

Also, there is another problem that the electric circuits become complicated because each of the light emission portions where a high voltage is applied must be controlled by a driving unit on the basis of information from a plurality of segmented photometric portions provided for a plurality of the light emission portions.

There is also known an apparatus disclosed in Japanese Patent Laid-Open Application No. 63-115148 as a flash lighting apparatus which controls the light orientational distribution in accordance with the spatially distributional state of subjects. This apparatus is provided with a plurality of flash bulbs in order to perform segmental irradiations for different areas in the image plane of a photographing subject by controlling the light emission or otherwise for each of the flash bulbs.

However, there are problems given below for those conventional flash lighting apparatuses described above.

(1) Due to the necessity of plural flash bulbs and light orientational optical system for each of the light bulbs, the size of the apparatus as a whole tends to be larger and its weight also becomes heavier.

(2) The light emissions of plural flash bulbs require the use of a larger amount of energy. Also, the heat generation is great when they are used in succession.

(3) The plural flash bulbs and light orientational optical system required for each of the bulbs tend to result in the irregularity of light orientations because the overlapping or missing of light irradiation takes place at each boundary between segmented areas.

(4) It is necessary to provide light adjusting circuits for adjusting the respective light emissions of a plurality of flash bulbs. Hence making its control complicated.

SUMMARY OF THE INVENTION

It is an object of the present invention to provide a flash lighting apparatus capable of conducting a flash photography of plural subjects having different film-to-subject distances with correct exposure.

It is another object of the present invention to provide a flash lighting apparatus capable of controlling light orientational distributions with one flash bulb thereby to solve the above-mentioned problems, and a camera equipped with the aforesaid flash lighting apparatus.

It is still another object of the present invention to provide a flash lighting apparatus capable of selecting whether a light irradiation amount is adjusted or not and at the same time, performing a light irradiation amount control in consideration of the response time of a light irradiation amount adjustment member.

Now, in conjunction with FIG. 2 and FIG. 3 showing an embodiment, the present invention will be described. In a flash lighting apparatus according to the present invention, there are provided a light emission portion, that is, a flash bulb 1, and a plurality of emission areas 2a to 2c arranged in front of the flash bulb 1, which are allocated for the light irradiation areas correspondingly, and by the provision of a light amount adjusting means, that is, a light orientational distribution controlling element 2, which adjusts each amount of lights emitted from these plural emission areas to be a value suitable for the corresponding irradiation area, the above-mentioned objectives are attained.

Each amount of lights being emitted from the plural emission areas 2a to 2c of the light orientational distribution controlling element 2 is adjusted to be a value suitable for the corresponding irradiation area.

A flash lighting apparatus according to another embodiment is such that the value for the aforesaid corresponding irradiation area is replaced with the one based on the spatially distributional state of subjects.

In this embodiment, the amount of light for each of the irradiation areas is defined in accordance with the spatially distributional state of the subjects.

A flash lighting apparatus according to still another embodiment is such that the light beams emitted through the aforesaid light orientational distribution controlling element 2 are defined asymmetrically with respect to the optical axis of the camera on which this flash lighting apparatus is mounted.

According to this embodiment, the distribution of the light amounts can be controlled to become asymmetrical if the spatially distributional state of the subjects should be asymmetrical with respect to the optical axis of a camera as shown in FIG. 14A, for example. As a result, it is possible to provide each of the subjects with a substantially even illumination.

A camera equipped with a flash light apparatus according to the present invention is provided with a light emission portion, that is, a flash bulb 1 and a plurality of emission areas 2a to 2c for corresponding irradiation areas, which are arranged in front of the flash bulb 1, and the above-mentioned objectives are attained by the provision of light amount adjusting means, that is a light orientational distribution controlling element 2, which controls the light amounts emitted from these plural emission areas 2a to 2c, and detection means comprising a focus detection photoelectric conversion element 32, focus detecting circuit 35, and CPU 37, which detects the spatially distributional state of subjects, and distribution controlling element, that is, the CPU 37, for adjusting each amount of the emitting lights from the aforesaid emission areas 2a to 2c by controlling the aforesaid light orientational distribution controlling element 2 so that the distribution of the amounts of lights emitted from the aforesaid light orientational distribution controlling element 2 can be a value suitable for the spatially distributional state of the subjects.

According to this embodiment, the camera obtains by detecting means 32, 35, and 37 the above-mentioned spatially distributional state on the basis of each of the film-to-subject distances for each subject, and in accordance with the result thus obtained, the amount of light for each of the irradiation areas 2a to 2c of the light orientational distribution controlling element 2 is adjusted. It is therefore possible to provide a substantially even illumination irrespective of the film-to-subject distances.

Now, in conjunction with FIG. 4, another embodiment according to the present invention will be described. For a flash lighting system according to this embodiment, there are provided a flash apparatus 102 comprising a light emission portion 100 for emitting a flash light, and a light shielding portion 101 for shielding the flash of the light emission portion 100 almost completely, a photometer 103 for photometrically measuring the light emitted from the flash apparatus 102 and reflected from the field, and a controller 104 for outputting light shielding signals to the light shielding portion 101 on the basis the photometric result obtained by this photometer 103. Hence achieving the above-mentioned objectives.

In this embodiment, the light shielding portion 101 of the flash apparatus 102 shields the flash of the light emission portion 100 almost completely in accordance with the shielding signals from the controller 104 transmitted on the basis of the photometric result of the photometer 103.

Now, in conjunction with FIG. 5, another embodiment according to the present invention will be described. A flash apparatus 202 of a flash lighting system according to this embodiment has a plurality of segmented emission areas corresponding to a plurality of irradiation areas of a field, and there are provided segmented light shielding portions 201a, 201b, and . . . for shielding the flash of the light emission portion 200 almost completely for each of the emission areas; a photometer 203 has segmented photometric portions 203a, 203b, and . . . for photometrically measuring the light for each of the photometric areas by segmenting the field into a plurality of photometric areas; and a controller 204 outputs shielding signals to each of the segmented light shielding portions 201a, 201b, and . . . on the basis of the photometric result of each of the segmented photometric portions 203a, 203b, and . . .

In this embodiment, each of the segmented light shielding portions 201a, 201b, and . . . of the flash apparatus 202 shields the flash of the light emission portion 200 almost completely in accordance with the light shielding signals from the controller 204 transmitted on the basis of the photometric result of each of the segmented photometric portions 203a, 203b, and . . . of the photometer 203.

Also, in a flash lighting apparatus according to another embodiment, the segmental configurations of the plural emission areas of the flash apparatus 202A and the segmental configurations of the plural photometric areas of the photometer 203A are made of substantially a same shape.

Now, in conjunction with FIG. 6, another embodiment according to the present invention will be described. A flash lighting apparatus according to this embodiment is applicable to a flash lighting apparatus provided with a flash apparatus 300 for emitting flash, and then the above-mentioned objectives are attained by the provisions of a light amount controller 301 for controlling the external emission of the flash light amount, and a discriminating device 302 for determining whether or not the flash light emission amount should be controlled by this light amount controller 301.

In this embodiment, the discriminating device 302 determines whether or not the flash light emission amount should be controlled by the light amount controller 301, and the light amount controller 301 controls the external flash light emission amount.

A discriminating device 302A of a flash lighting apparatus according to another embodiment is arranged to determine whether or not the flash light emission amount should be controlled by the light amount controller 301 on the basis of the specific output of an external operation member 303 which is provided therefor.

A discriminating device 302B of a flash lighting apparatus according to another embodiment is arranged to make its judgment by comparing the response time of the light amount controller 301 and the time required from the preparatory state of a camera to the photography to the start of photographing.

A discriminating device 302C of a flash lighting apparatus according to another embodiment is arranged to make its judgment in accordance with the kinds of cameras on which the flash lighting apparatus is mounted.

A light emission apparatus 300A of a flash lighting apparatus according to another embodiment is provided with a photometer 304 which performs a preliminary emission and regular emission and conducts its photometric measurement of the reflecting rays of light from a subject, and a light amount controller 301A controls the flash light amount to the outside of the flash lighting apparatus on the basis of the photometric result of the photometer 304 at the time of the regular emission.

In this embodiment, the photometer 304 measures the reflection rays of light from a subject photometrically at the time of the preliminary emission, and the light amount controller 301A controls the flash light emission amount to the outside of the flash lighting apparatus on the basis of the photometric result of the photometer 304 at the time of the regular emission.

A photometer 304A of a flash lighting apparatus according to another embodiment conducts the photometric measurement of light for each of the plurally segmented photometric areas in a field, and a light amount controller 301B has the plural light emission areas corresponding to the plural photometric areas of the photometer 304A to control the flash light emission amount for each of the corresponding emission areas on the basis of the photometric result for each photometric area.

A flash lighting apparatus according to another embodiment is provided with a temperature detector 305 for detecting temperatures, a correcting device 306 for correcting the control characteristics of the light amount controller 301 in accordance with the detected temperatures of this temperature detector 305.

A correcting device 306 in another embodiment corrects the control characteristics of the light amount controller 301 in accordance with the detected temperatures of the temperature detector 305.

BRIEF DESCRIPTION OF THE DRAWINGS

FIG. 4 and FIG. 5 are schematic views showing the structure of an embodiment according to the present invention;

FIG. 26 is a block diagram showing the structure of an embodiment;

FIG. 27 is a cross-sectional view showing a segmented irradiation type flash apparatus according to the present invention;

FIG. 28 is a flowchart showing the operation of an irradiation light amount adjustment;

DETAILED DESCRIPTION OF THE PREFERRED EMBODIMENTS

Figure 2:
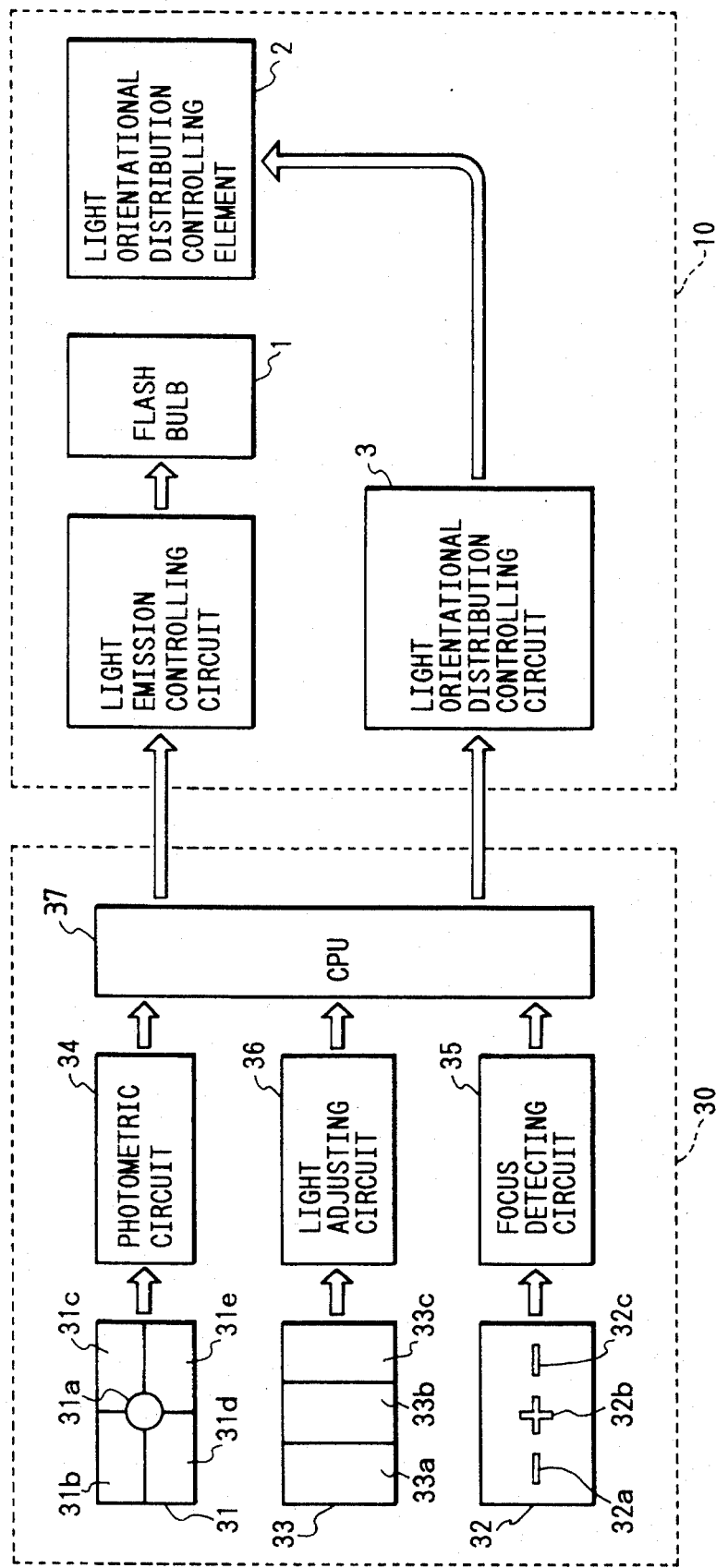
FIG. 2 is a block diagram showing the entire structure.
Figure 6:
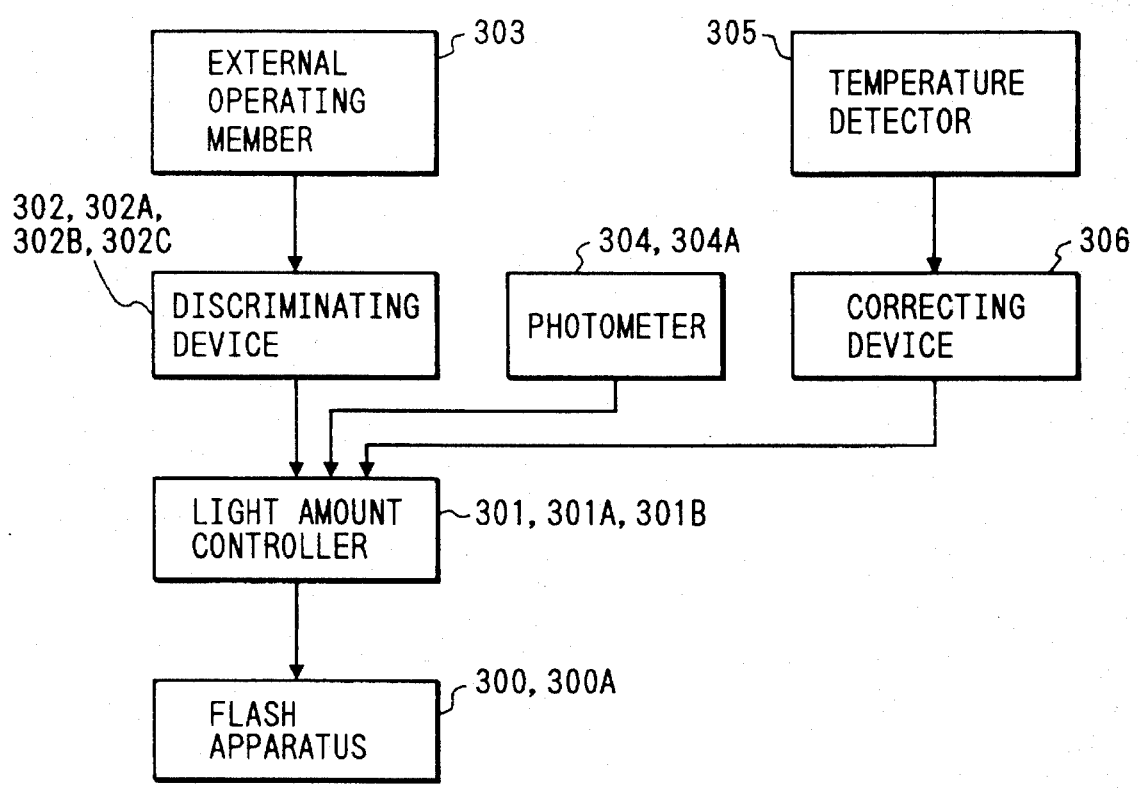
FIG. 6 is a schematic view showing the structure of an embodiment according to the present invention.

FIG. 2 is a block diagram showing the control of a camera equipped with a flash lighting apparatus. A reference numeral 10 designates a flash lighting apparatus and 30, a camera with the flash lighting apparatus mounted thereon or connected thereto. The flash lighting apparatus 10 is provided with a known flash bulb 1, a light emission controlling circuit 3 for this flash bulb 1, a light orientational distribution controlling element 2 arranged in front of the flash bulb 1, and a controlling circuit 3 for this light orientational distributional controlling element 2.

Figure 1:
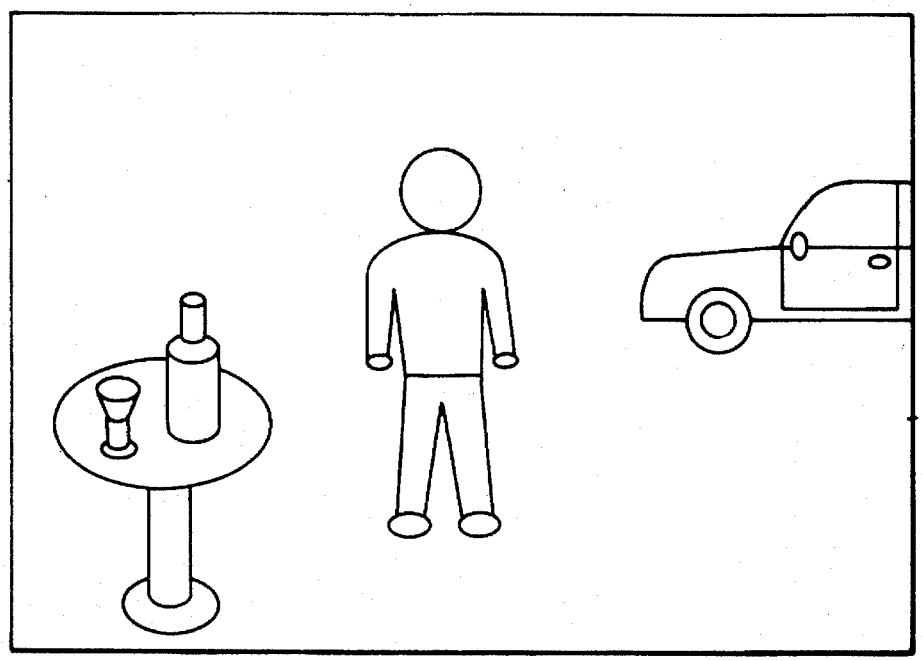
FIG. 1 is a view illustrating a case where a plurality of subjects are present at different film-to-subject distances in a field.
Figure 3:
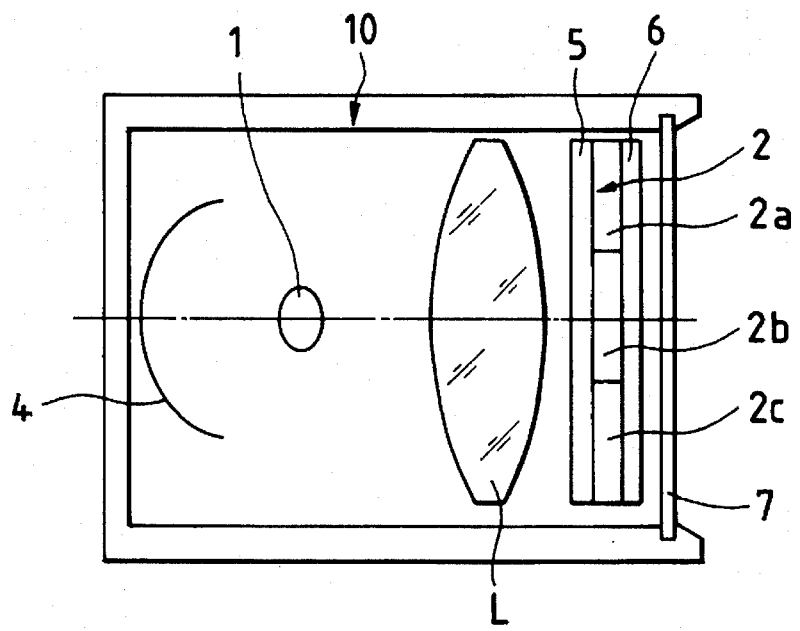
FIG. 3 is a horizontally cross-sectional view showing the inner part of a flash lighting apparatus.

FIG. 3 is a horizontally cross-sectional view showing the inner part of the flash lighting apparatus 10 in detail. This flash lighting apparatus 10 has a flash bulb 1, a reflection shade 4, a light orientation lens L, a light orientational distribution controlling element 2, deflection plates 5 and 6 arranged in front and back of this light orientational distribution controlling element 2, and a protection glass 7.

Figure 7:
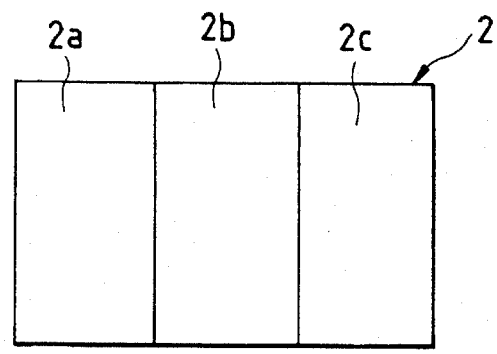
FIG. 7 is a front view showing a light orientational distribution controlling element.
Figure 8:
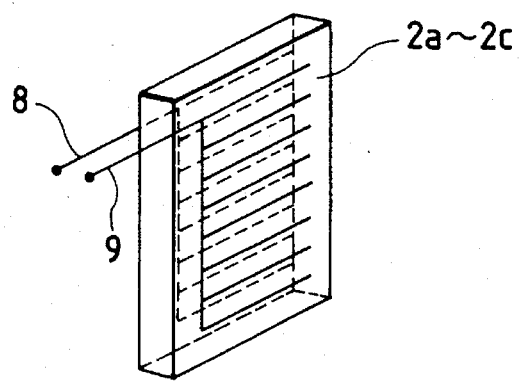
FIG. 8 is a perspective view illustrating a light transmittable ceramic constituting a light orientational distribution controlling element.
Figure 9:
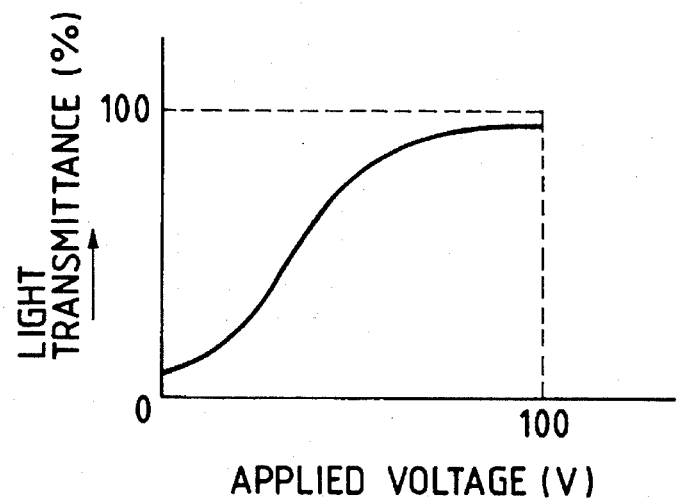
FIG. 9 is a graph showing the characteristics of the light transmittance of the light transmittable ceramic with respect to the applied voltages.

The light orientational distribution controlling element 2 is formed by a light transmittable ceramic (PLZT) or liquid crystal, and in this embodiment, three light transmittable ceramics 2a to 2c are arranged in parallel in the horizontal direction as shown in FIG. 7. Each of the light transmittable ceramics 2a to 2c is provided with transparent facing electrodes 8 and 9 as shown in FIG. 8, and a voltage applied across the facing electrodes 8 and 9 is varied to enable the control of the light transmittance as shown in FIG. 9. Therefore, while a field is divided into three areas, left, center, and right, and by controlling the light transmittance for each of the areas, it is possible to adjust the light orientational distribution in the field.

Now, reverting to FIG. 2, a camera 30 has a segmented photometric element 31 for exposure control, photoelectric conversion element 32 for focus detection, and a segmented photometric element 33 for light adjustment. The segmented photometric element 31 for exposure control measures photometrically the incident light beam (mainly constant light) passing a photographing lens each in five segmental areas 31a to 31e. The photometric circuit 34 converts the photometric output into the luminance value by logarithmic compression. The photoelectric conversion element 32 for focus detection conducts its focus detection in the three focus detection areas 32a to 32c shown in FIG. 2. Accordingly, there are provided a pair of image sensor array in each of the focus detection areas. The focus detection circuit 35 works out the focus detecting state in each area by a known method on the basis of the focus detection signals from the pair of the image sensors in each of the focus detection areas. The light adjustment photometric element 33 is prepared to enable a photometry in the three areas 33a to 33c corresponding to the focus detection areas 32a to 32c and performs a segmental photometry of the incident light beam (mainly, the reflected rays of flash light from the subject) each in the areas 33a to 33c. The light adjusting circuit 36 amplifies the photometric signals from each of the areas of the light adjustment photometric element 33 to perform its time integration.

The output signals from each of the circuits 34 to 36 are inputted into a CPU 37. The CPU 37 is a one-chip microcomputer provided with ROM, RAM, and other peripheral circuits, and in accordance with the procedures which will be described later, it controls the light emission amount of the flash bulb 1 and at the same time, controls the light orientational distribution by controlling each of the light orientational distribution controlling elements 2a to 2c.

Figure 10:
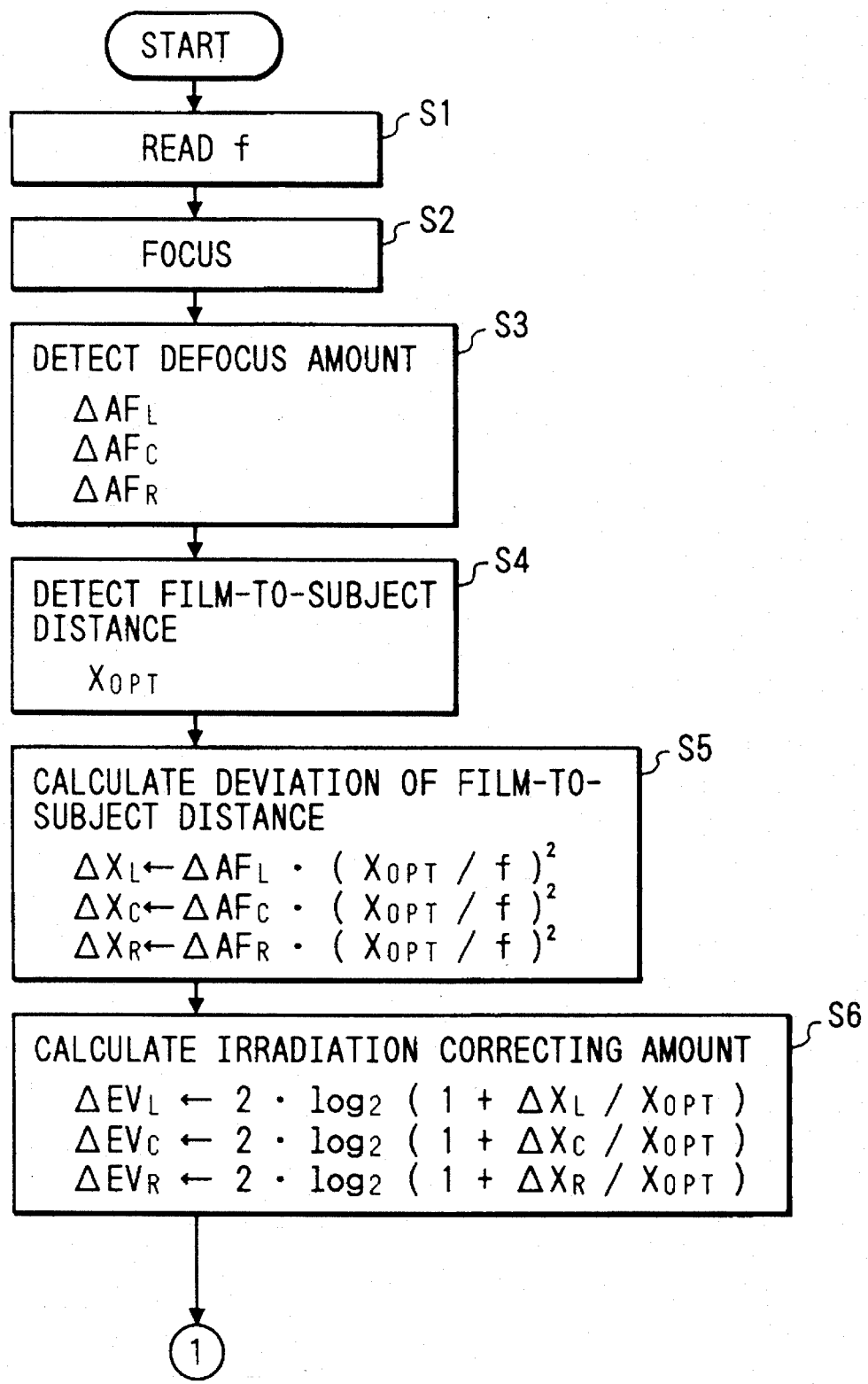
FIG. 10 is a flowchart showing the procedures to control the light orientational distribution in accordance with the spatially distributional state of subjects.
Figure 11:
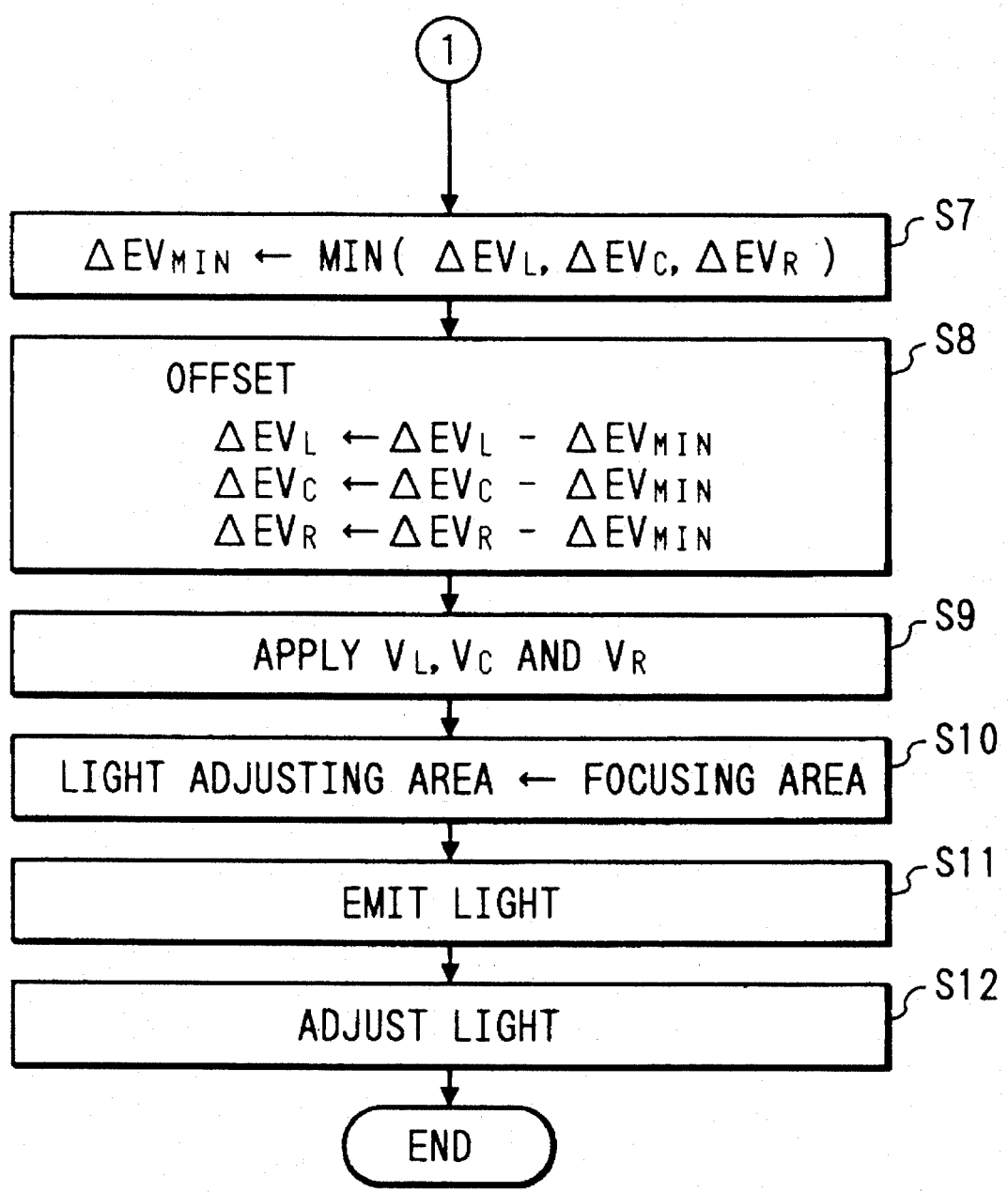
FIG. 11 is a continuation of the flowchart shown in FIG. 10.

Subsequently, in accordance with the flowcharts which are shown in FIG. 10 and FIG. 11, the description will be made of the detection of the spatially distributional state of the subjects and the accompanying procedures to adjust the light orientational distribution.

In step S1, the focal length f of the photographing lens is read. This step is executed by reading the stored information in the lens ROM in the photographing lens, for example. In step S2, an imaging is conducted by adjusting the focus of the photographing lens on the basis of the focus detection signals from the focus detection circuit 35.

Also, in step S3, on the basis of the result of the focus detection, the defocus amounts $\Delta AF_L$, $\Delta AF_C$, and $\Delta AF_R$ for the corresponding three focus detection areas 32a to 32c are computed. The defocus amount in the imaged area becomes a value most close to zero. Further in step S4, the position of the photographing lens in an imaged state is detected by a lens encoder and others to calculate the film-to-subject distance $X_{opt}$. Then, the process will proceed to step S5 to work out the deviated amount of the film-to-subject with the following equation for each of the areas on the basis of the defocus amount and lens position:

$$\Delta X_L = \Delta AF_L \cdot (X_{OPT}/f)$$

$$\Delta X_C = \Delta AF_C \cdot (X_{OPT}/f)$$

$$\Delta X_R = \Delta AF_R \cdot (X_{OPT}/f)$$

Then, proceeding to step S6, the irradiation correcting amount is worked out by the following equation:

$$\Delta EV_L = 2 \cdot \log_2(1 + \Delta X_L/X_{OPT})$$

$$\Delta EV_C = 2 \cdot \log_2(1 + \Delta X_C/X_{OPT})$$

$$\Delta EV_R = 2 \cdot \log_2(1 + \Delta X_R/X_{OPT})$$

This irradiation correcting amount is an amount to be corrected for the corresponding area, and represents a relative ratio of the irradiation amounts between the areas.

Then, proceeding to step S7, the minimum value $\Delta EV_{min}$ of the irradiation correcting amounts calculated in the step S6 is obtained. The process will further proceed to step S8 to express by the following equation the irradiation correcting amount of each of the areas as the offset value from the minimum value:

$$\Delta EV_L = \Delta EV_L - \Delta EV_{MIN}$$

$$\Delta EV_C = \Delta EV_C - \Delta EV_{MIN}$$

$$\Delta EV_R = \Delta EV_R - \Delta EV_{MIN}$$

From the above-mentioned computations, the offset value of the minimum value of the irradiation correcting amount becomes zero.

Figure 12:
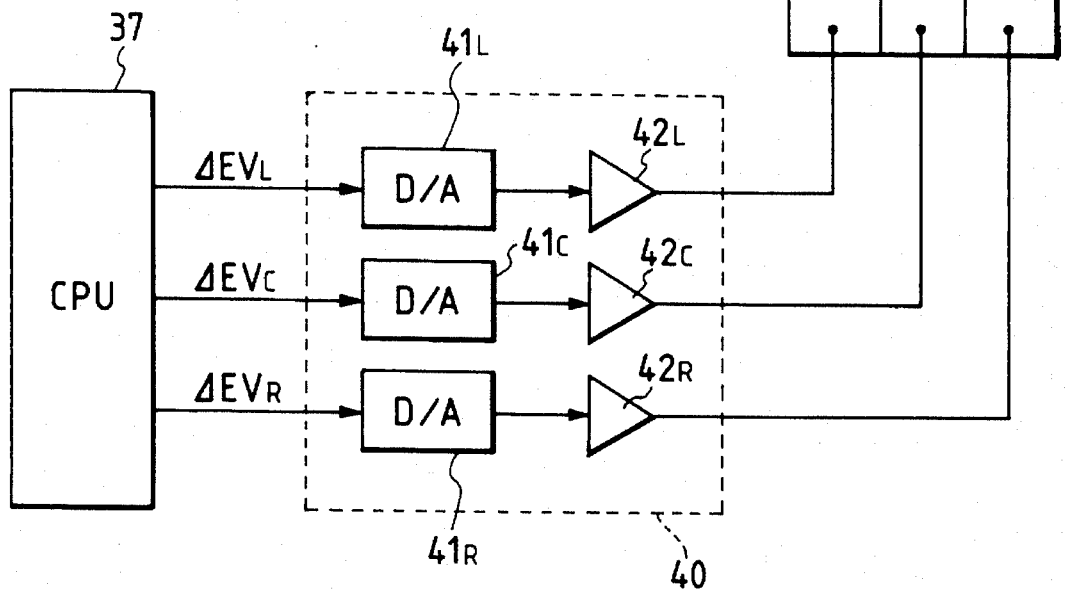
FIG. 12 is a view showing a circuit for converting the irradiation correcting amounts which are output from a CPU into applied voltages.

Subsequently, in step S9, voltages $V_L$, $V_C$, and $V_R$ are applied to the respective electrodes 8 and 9 of the light transmittable ceramics 2a to 2c which constitute the light orientational distribution controlling element 2. Thus, each of the light transmittable ceramics 2a to 2c has a light transmittance corresponding to the applied voltage. The applied voltages $V_L$, $V_C$, and $V_R$ are obtained by processing the irradiation correcting amounts $\Delta EV_L$, $\Delta EV_C$, and $\Delta EV_R$ output from the CPU 37 by the converting circuit 40 shown in FIG. 12 for the D/A conversion, and are being biased. The reason why the bias is given is that even when the offset value $\Delta EV$ is zero, the light transmittance should be established at a predetermined value which is not zero. Here, in FIG. 12, reference numerals $41_L$, $41_C$, and $41_R$ designate D/A converters, and $42_L$, $42_C$, and $42_R$ amplifiers which amplify the outputs of the D/A converters and bias them.

After that, in step S10, an imaging area is selected as a light adjusting area. Then, in step S11, a light emission is started. In step S12, the light adjustment control is performed. The light emission controlling and light adjustment controlling are conducted by known techniques, and their detailed description are omitted. At least, however, the light emission is started by operating a release, and in the step S12, the light emission is stopped when the integral value of the output from the selected light adjustment photometric element arrives at a standard level.

Figure 13:
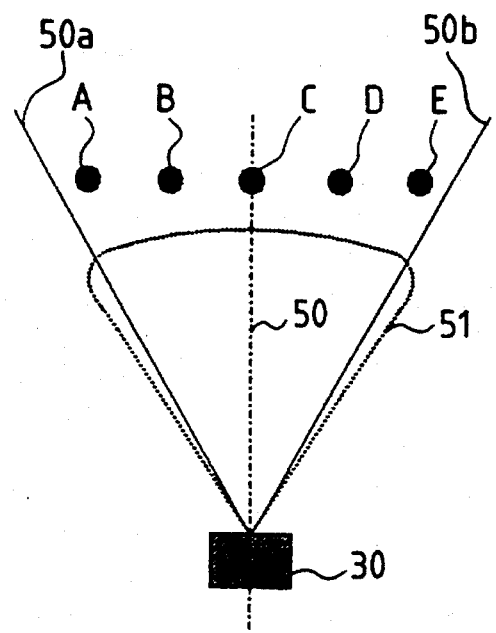
FIG. 13 is a view illustrating the spatially distributional state of subjects and the corresponding light orientational distribution controlling state.

In a camera which is provided with a flash lighting apparatus such as this, the light orientational distribution is controlled in accordance with the spatially distributional state of the subjects as shown in FIG. 13 to FIG. 15. Hence irradiating a closer subject and a farther subject with substantially the same amount of light.

Figure 14A:
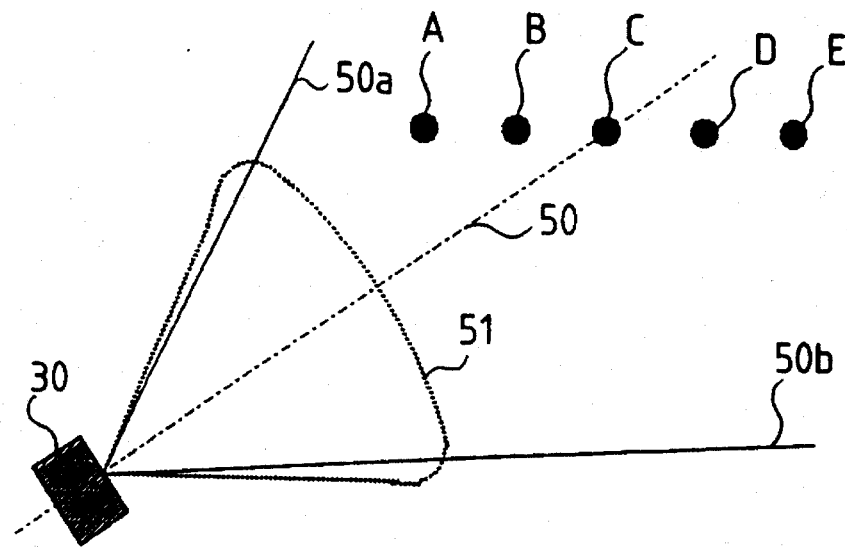
FIG. 14A and FIG. 14B are views illustrating the spatially distributional state of subjects and the corresponding light orientational distribution controlling state.
Figure 14B:
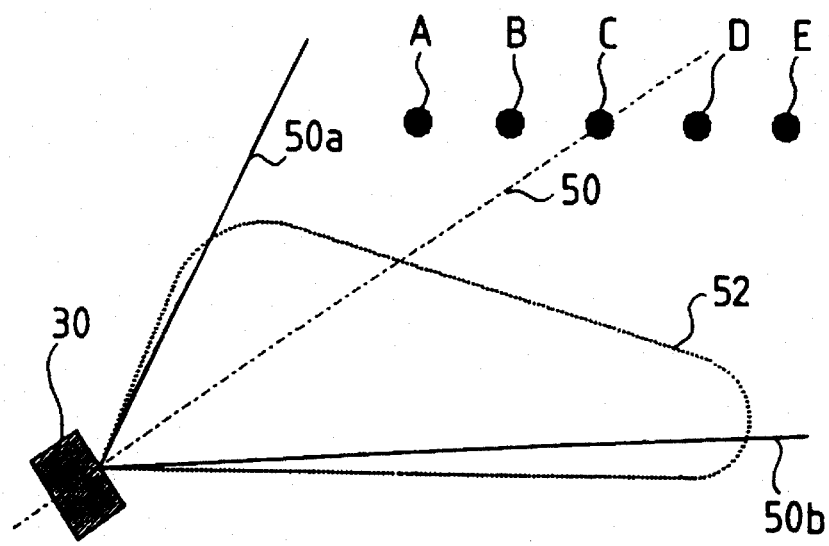

FIG. 13 illustrates a case where a plurality of subjects A to E are aligned at substantially equal distances. In this case, the light transmittances of the light transmittable ceramics 2a to 2c which constitute the light orientational distribution controlling element 13 are controlled almost equally, and as indicated by a broken line 51, the light orientational distribution becomes symmetrical with respect to the optical axis 50 of a camera. When the distances to a plurality of subjects A to E become gradually farther as shown in FIG. 14A, the amount of light becomes increasingly insufficient for a farther subject if the light orientational distribution is such as indicated by the broken line 51 in FIG. 14 (the light transmittances of the light transmittable ceramics 2a to 2c substantially equal), and the resultant photograph shows an under-exposure condition. Therefore, as indicated by the broken line 52 in FIG. 14B, the light transmittances of the light transmittable ceramics 2a to 2c are controlled so that the light orientational distribution can be obtained asymmetrically with respect to the optical axis of the camera thereby to make it possible to provide each of the subjects with a substantially even irradiation amount of light.

Figure 15A:
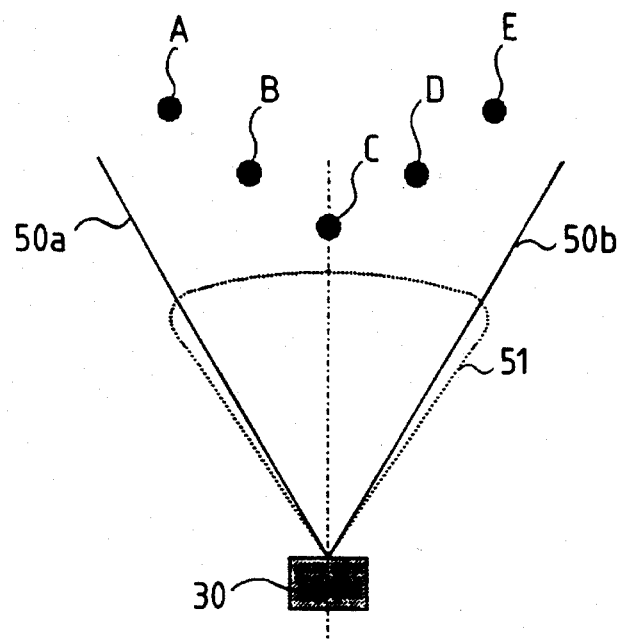
FIG. 15A and FIG. 15B are views illustrating the spatially distributional state of subjects and the corresponding light orientational distribution controlling state.
Figure 15B:
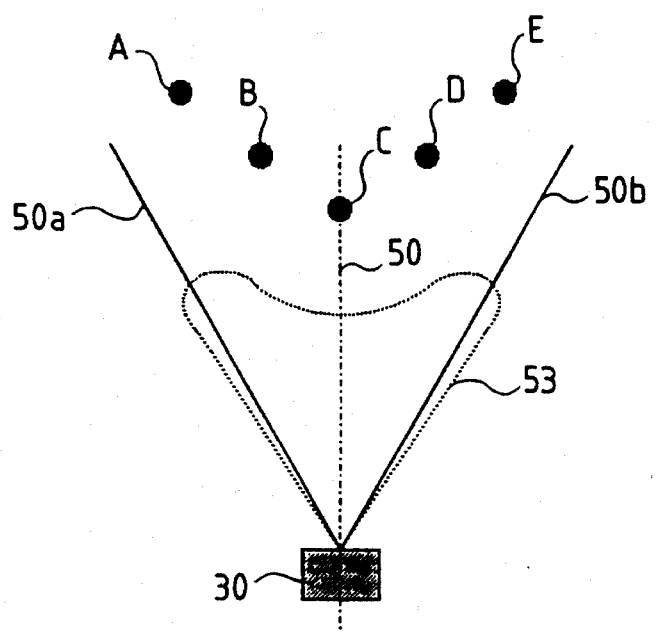

Further, if a light orientational distribution is controlled evenly as indicated by the broken line 51 in FIG. 15A in a case where the distance to the central subject is the closest while the distances to the subjects on the left and right hand sides become gradually farther as shown in FIG. 15A, the amount of light becomes insufficient for the subject farther away, and the resultant photography also shows an under-exposure condition. Therefore, the light transmittances of the light transmittable ceramics 2a to 2c are controlled so that the light orientational distribution can be arranged as indicated by the broken line 53 in FIG. 15B. Then, a substantially even amount of emitting light is obtainable for each of the subject to conduct photography with correct exposure.

In this respect, reference numerals 50a and 50b in FIG. 13 to FIG. 15 designate the irradiation ranges provided symmetrically with respect to the optical axis 50 of the camera.

Also, unlike conventional examples, the present embodiment uses only one flash bulb, and the light emitted from the flash bulb is orientated to the subjects by controlling its amount of light by the light orientational distribution controlling element for each of the three areas when emitted. Therefore, the apparatus can be made small and light in its weight, and the energy to be used is also small to minimize the amount of calorification in its continuous use. Also, there is no generation of overlapping or missing of the irradiation lights at the boundaries between each of the segmented areas. Thus, any irregular light orientation can be prevented. Moreover, the circuit structures can be simplified because it suffices if only one light adjustment circuit is provided.

According to the present invention in this respect, the film-to-subject distances to a plurality of different subjects in a field are detected and the illuminating amount of light is adjusted in accordance with such detection, but it may be possible to conduct a pre-emission of a flash lighting apparatus before photographing, and by measuring the reflecting amounts of light from the subjects for the respective areas to determine the illuminating amount of light thereby to control the driving of the light orientational distribution controlling element.

Also, when the irradiating amount of light is adjusted by the light orientational distribution controlling element for each of the areas, the area where an image is in focus is established as a standard area. Then, the irradiating amounts of light for the other areas are determined on the basis of the irradiating amount of light for this standard area as reference. However, it is not necessarily required to establish the area where the image is in focus as a standard area. It may be possible to define the area in which the closest subject or fartherest subject is located as the standard area. If the area where the image is focused should be established as the standard area, the light transmittance of the light transmittable ceramic for such an area is set to be approximately 50%, and the light transmittance for the area where the closest subject is controlled to be a value less than 50% while the transmittance for the area where the fartherest subject is to be a value exceeding 50%. When the area where the closest subject is preset or the area where fartherest one is present is established as the standard area, the light transmittance of the light transmittable ceramic in the closest area is set to be small while the light transmittance of the furtherest area, large, and the light transmittance of the imaged area is controlled to be the intermediate value between them in either case.

Figure 16:
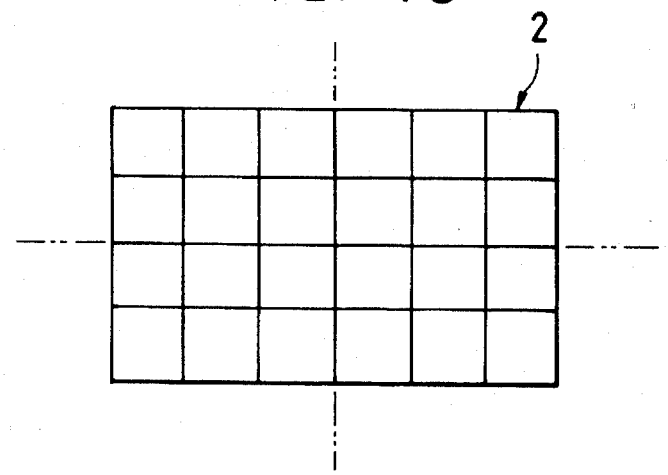
FIG. 16 is a front view showing another embodiment of a light orientational distribution element.

Further, in the above-mentioned embodiment, while the focus detection area is divided into three and the light adjusting area is also divided into three correspondingly, it may be possible to divide the focus detection area more finely and accordingly, segment the light orientational distribution controlling element more as shown in FIG. 16.

Also, in the above-mentioned embodiment, the arrangement is made to control the amount of light beam reflected by the reflection shade by the light orientational distribution controlling element for each of the areas, but it may be possible to segment the reflection plane of the reflection shade in the same manner as mentioned above so as to control the reflection factor of each segmented area variably. In this case, if an ECD (electrochromic device) or other element is used for the reflection plane, it is possible to control the reflection factor as required. Therefore, the phrase "arranged in front of the light emission portion" used in the specification means not only a location "physically forward" but also "optically forward".

In an embodiment of the above-mentioned structure, a flash bulb 1 constitutes the light emission portion; a light orientational distribution controlling element 2, light amount adjusting means; a focus detection photoelectric conversion element 32, focus detection circuit 35, and CPU 37, means for detecting the spatially distributional state of subjects; and the CPU 37 and light orientational distribution controlling circuit 3, distribution controlling means, respectively.

As described above in detail, according to the present invention, it is arranged that using one light emission portion, the light which is emitted from the light emission portion is controlled by the light orientational distribution controlling element for each of plural areas with respect to its amount of light to give light emission toward objects. As a result, there are effects:

(1) to implement a miniaturization of the apparatus as a whole as well as to lighten its weight;

(2) to minimize the energy to be used and its carolification when used in succession;

(3) to prevent any irregular light orientation because unlike a conventional apparatus no overlapping or missing of irradiating light occurs at the boundaries between segmented areas; and (4) to simplify controlling circuits because it suffice if only a single light adjusting circuit is provided.

Also, it is possible to illuminate almost evenly a farther subject as well as closer subject if the amount of light for the corresponding emission area is controlled in accordance with the spatially distributional state of the subjects.

Figure 17:
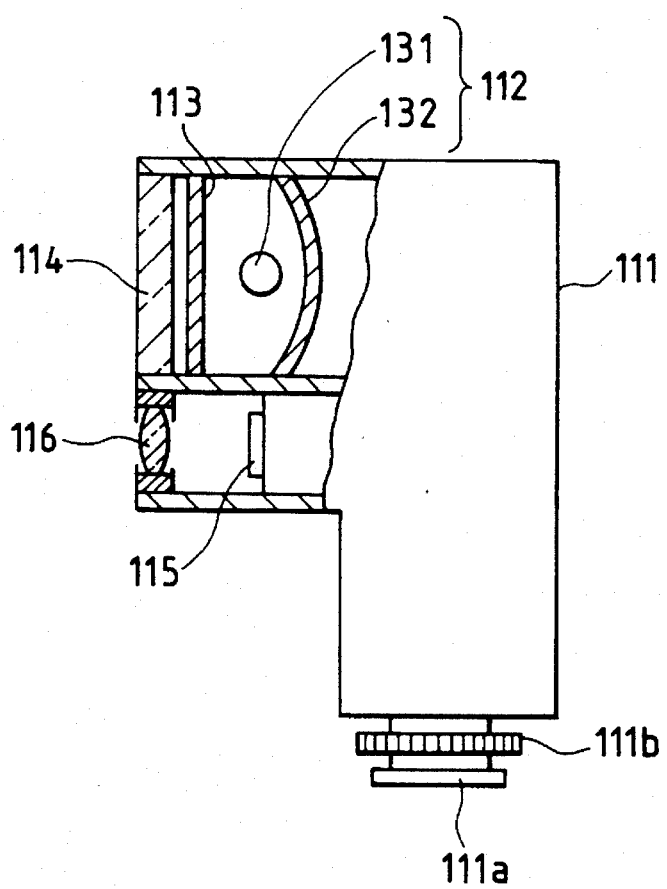
FIG. 17 is a view showing the external appearance of an flash lighting apparatus according to an embodiment.

FIG. 17 is a view showing the external appearance of a flash lighting apparatus according to an embodiment.

This flash lighting apparatus 111 is structured with a light emission portion 112 comprising a flash bulb 131 and a mirror 132; a light shielding portion 113 for shielding the flash from the light emission portion 112; a Fresnel lens portion 114 for diffusing the flash from the light emission portion 112; a photometric portion 115 for measuring photometrically the reflection light from the subject to be irradiated by the flash; a lens portion 116 for guiding the reflection light from the subject to the photometric portion 115; and a light emission controlling portion 117 (not shown) for controlling the light emission from the light emission portion 112, and can be mounted on a camera by inserting its mounting leg 111a into the accessory shoe of the camera (not shown) for fixation by a lock nut 111b. The transmission and reception of control instructions, data, and the like between the apparatus and the camera are conducted through the contact point provided for the accessory shoe and mounting leg 111a.

The light shielding portion 113 is arranged between the light emission portion 112 and the Fresnel lens 114. Also, the lens portion 116 and the photometric portion 115 having silicon photodiode (S.P.D.) plane are arranged closer to the camera rather than to the light emission portion 112 to secure an image which is closer to the photographing image of the camera.

Here, the light shielding portion 113 should ideally be provided to shield any flash from the light emission portion 112 completely so as not to leak it outside the flash lighting apparatus 111. However, if the leakage is slight, there is no problem for its practical use. The slight extent in this case is an extent where the correct value of the exposure amount in the irradiation area which is shield from the flash emission still remains within its allowable range.

Figure 18:
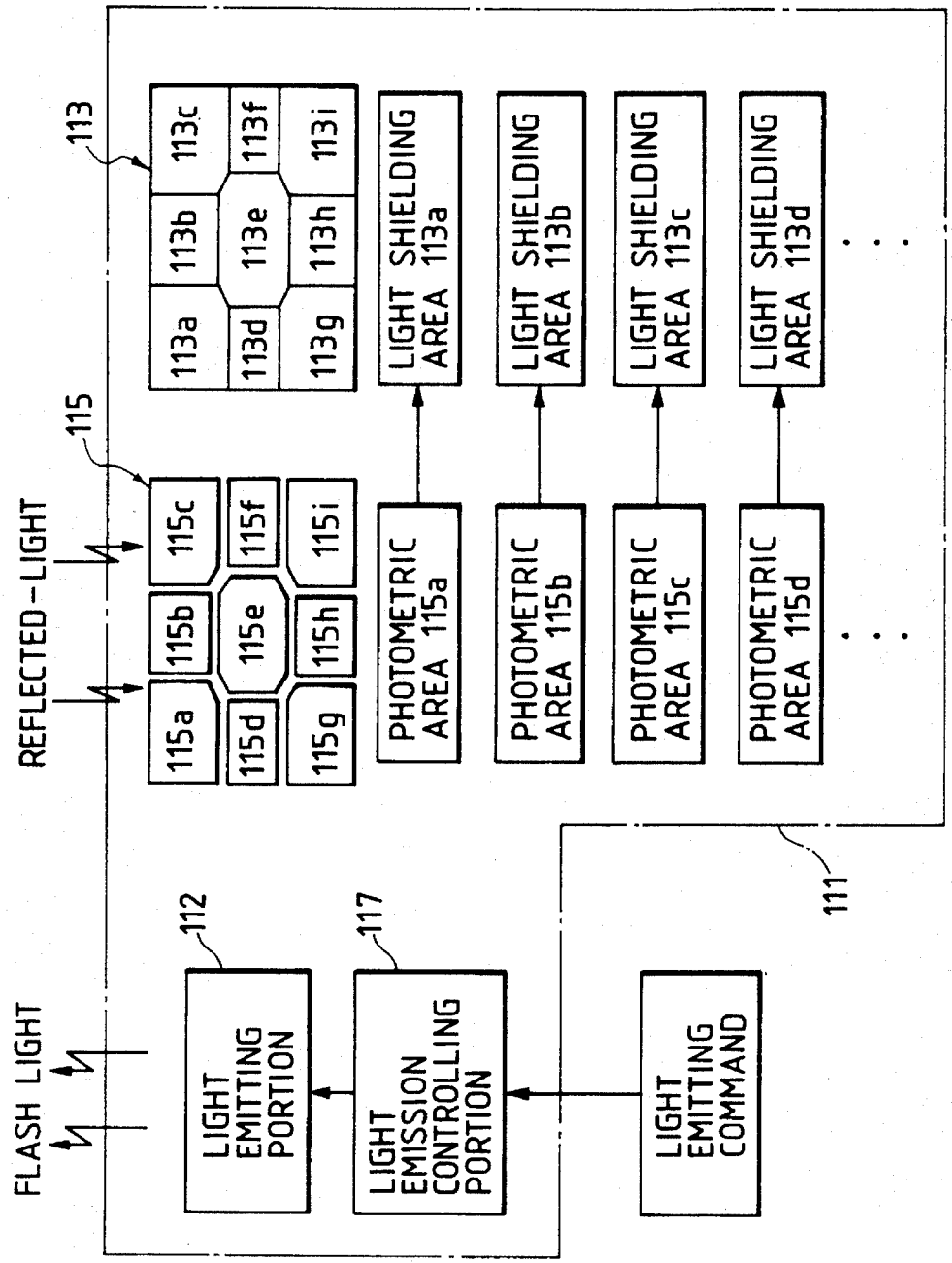
FIG. 18 is a view schematically showing an embodiment.

FIG. 18 is a view schematically illustrating a flash lighting apparatus 111 shown in FIG. 17.

The light emission controlling portion 117 which has received an light emission instruction from the camera transfers such instruction to the light emission portion 112 to allow the light emission portion 112 to emit a flash. The flash illuminates a subject to increase its illuminance. The lens portion 116 images the subject on the S.P.D. plane of the photometric portion 115. Then, the photometry of the reflection light from each of the areas of the subject is conducted on the S.P.D. plane which is divided into plural areas.

Here, it is assumed that the S.P.D. plane of the photometric portion 115 is divided into nine areas 115a to 115i to carry out its photometry for each of the areas, and that the shielding portion 113 is also divided into nine areas 113a to 113i corresponding to the nine areas 115a to 115i. of the photometric portion 115 in order to shield the flash from each of the areas.

When each of the S.P.D. areas 115a to 115i arrives at a certain exposure amount (illuminance by time), the light shielding instruction is output to the respective areas 113a to 113i of the light shielding portion 113 which correspond to the respective S.P.D. areas 115a to 115i. Each of the light shielding portions 113a to 113i shields the flash respectively by the light shielding instruction to prevent the exposure amount of the subject from becoming over in the direction to which the light shielding is provided.

With this method of shielding flash emission, it is possible to adjust the exposure amount reliably, and there is an advantage that the accuracy of the adjustment of exposure amount is high. Also, no light shielding is given to a subject in the direction of the area in which has not arrived a certain exposure amount yet. Thus such subject is irradiated by the flash as it is.

The control of the exposure amount is also performed by measuring an exposure amount with a TTL method in a camera besides the above-mentioned control. This TTL method is a method whereby to measure an exposure amount on the film plane and transmit a light emission suspension instruction to the light emission controlling portion 117 when a certain exposure amount is reached. Thus conducting the adjustment of the total exposure amount.

Also, when the present invention is applied to a strobe capable of changing its irradiation angles, the lens portion should be zoomed in accordance with the irradiation angles, and only the portion corresponding to the irradiation range should be imaged on the photometric portion.

In the present embodiment, while the photometric portion 115 is provided for the flash lighting apparatus 111, it may be possible to provide the photometric portion 115 for the camera main body to conduct a TTL photometry.

Figure 19:
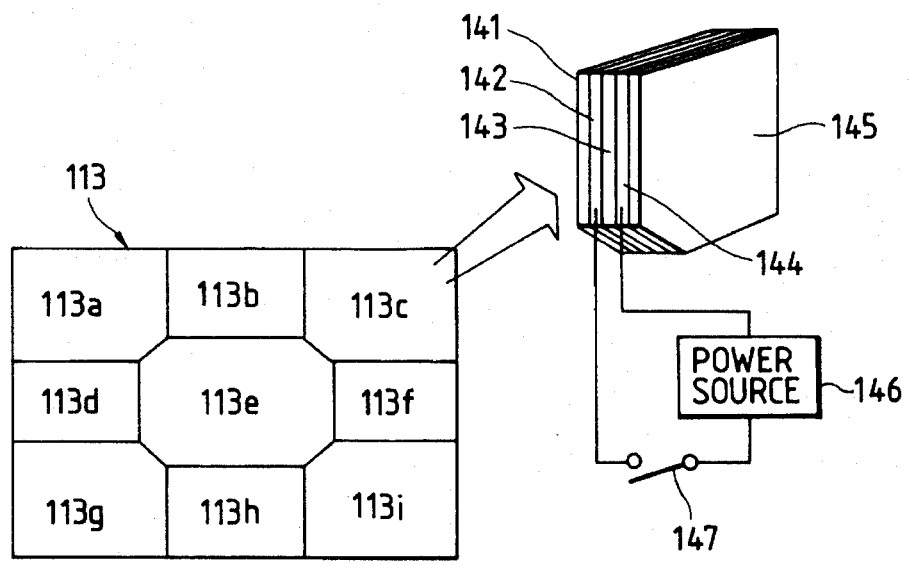
FIG. 19 is a cross-sectional view showing a light shielding portion according to the present invention using a bulk type electrooptical modulating element.

FIG. 19 is a view showing the light shielding portion in detail.

As described above, the light shielding portion 113 is divided into nine areas 113a to 113i, and the light shielding operation is performed for each of the areas 113a to 113i in accordance with the light shielding instruction on the basis of the photometric result for each of the corresponding areas 115a to 115i of the photometric portion 115. Each of the areas 113a to 113i of the light shielding portion 113 comprises a polarization plate 141, transparent electrode 142, bulk type electrooptical modulation element (PLZT) 143, transparent electrode 144, and photodetection plate 145. In the respect, the structure of an area 113c is shown in FIG. 19, but all the other areas are also structured in the same manner. Here, the polarization plate 141 faces the light emission portion 112. To the both faces of the bulk type electrooptical modulation element (PLZT) 143, a voltage is applied from a power source 146 through a switch 147.

Figure 20B:
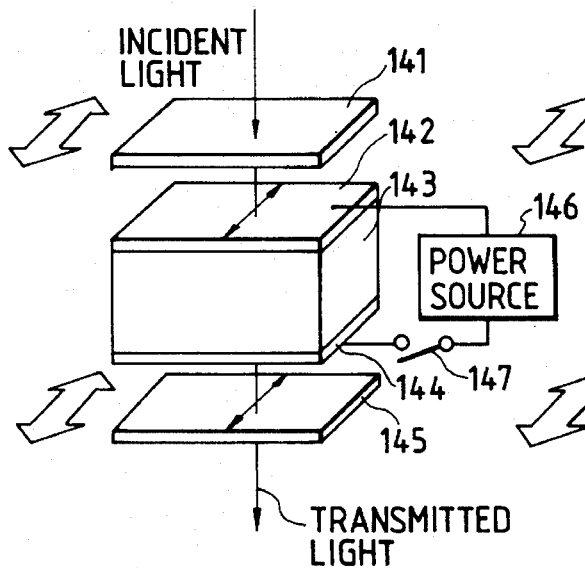
FIGS. 20A and 20B are views showing the principle of the light shielding by the bulk type electrooptical modulating element.
Figure 20A:
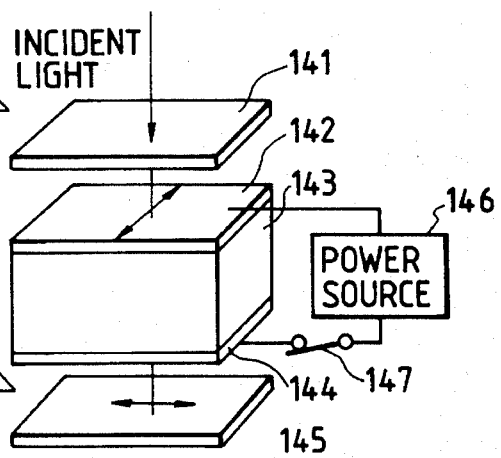

FIG. 20A and FIG. 20B are views showing the principle of light shielding by PLZT (PbLa $(ZrTi)O_3$) which is the bulk type electrooptical modulation element according to the present embodiment.

The PLZT 33 has a property that its diffraction factor is changed when a voltage is applied and the optical phase difference of the incident light is also changed so that its output light is polarized. Therefore, if the polarization axes of the polarization plate 141 and photodetection plate 145 are matched and the PLZT incident light which is linearly polarized by the polarization plate 141 is caused to change its optical phase difference by $\pi$ with the application of a voltage to the PLZT 143 as shown in FIG. 20A, then the output light from the PLZT 143 becomes a linearly polarized light in the direction perpendicular to the incident light. Thus making the light shielding of the photodetection plate 145 possible.

On the other hand, as shown in FIG. 20B, if no voltage is applied to the PLZT 143, the optical phase difference of the output light is not changed. Thus, light is allowed to transmit through the photodetection plate 145. In the present embodiment, an arrangement is made so that when the exposure amount of each area 115a to 115i of the photometric portion 115 has arrived at a certain amount, a voltage should be applied to the PLZT 143 of each area 113a to 113i of the shielding portion 113.

In this respect, according to the above-mentioned embodiment, while the PLZT is used as the bulk type electrooptical modulation element 33, $KH_2PO_4$, $NH_4H_2PO_4$, $Bi_{12}SiO_{20}$, or the like has the same structure and operates in the same manner for the production of the same effects.

Also, in the above-mentioned embodiment, while a voltage is applied to the bulk type electrooptical modulation element 143 in parallel in the traveling direction of the light as shown in FIG. 20A and FIG. 20B, it may be possible to apply it in the direction perpendicular to the light. In such a case, there is no need for transparent electrodes between the polarization plate and bulk type electrooptical modulation element, and the bulk type electrooptical modulation plate and photodetection plate. There is lithium niobate (LiNbO$_3$), LiTaO$_3$, Ba$_2$NaNb$_5$O$_{15}$, SrxBa$_1$—xNb$_2$O$_6$, PbO·xNbO$_3$, or the like for the bulk type electrooptical modulation element which can be used in a structure such as this. In this respect, a reference mark x designates an arbitrary number.

Figure 21:
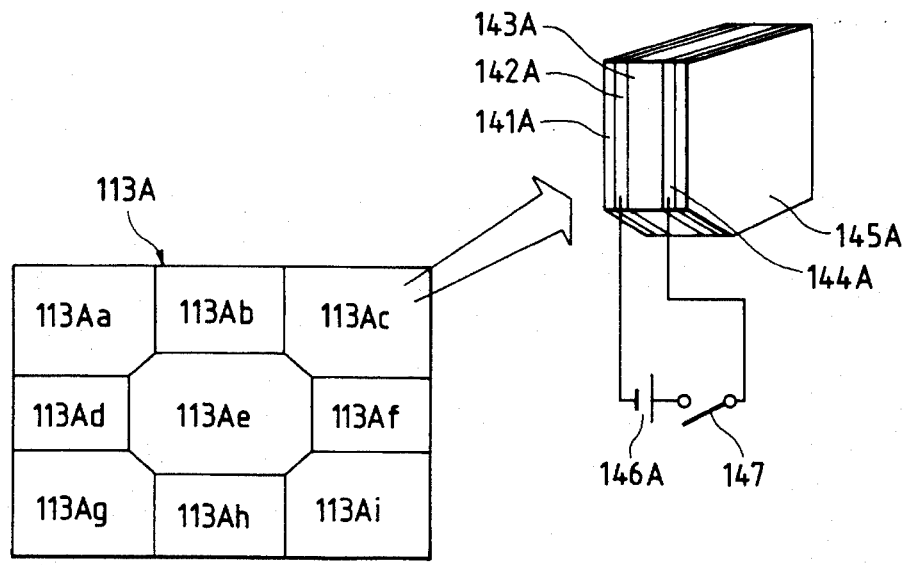
FIG. 21 is a cross-sectional view showing a light shielding portion according to the present invention using a liquid crystal.

FIG. 21 is a cross-sectional view showing a light shielding portion using a liquid crystal instead of a bulk type electrooptical modulation element.

Each of the areas 113Aa to 113Ai of the light shielding portion 113A comprises a polarization plate 141A, transparent electrode 142A, liquid crystal 143A, transparent electrode 144A, and photodetection plate 145A. For this liquid crystal 143A, a torsion nematic type liquid crystal is desirably suited. In this respect, the structure of the area 113Ac is shown in FIG. 21, but the other areas are also structured in the same manner. Also, the polarization plate 141A is arranged to face the light emission portion 112. To both the faces of the liquid crystal 143A, a voltage is applied from a power source 146A through a switch 147.

Figure 22B:
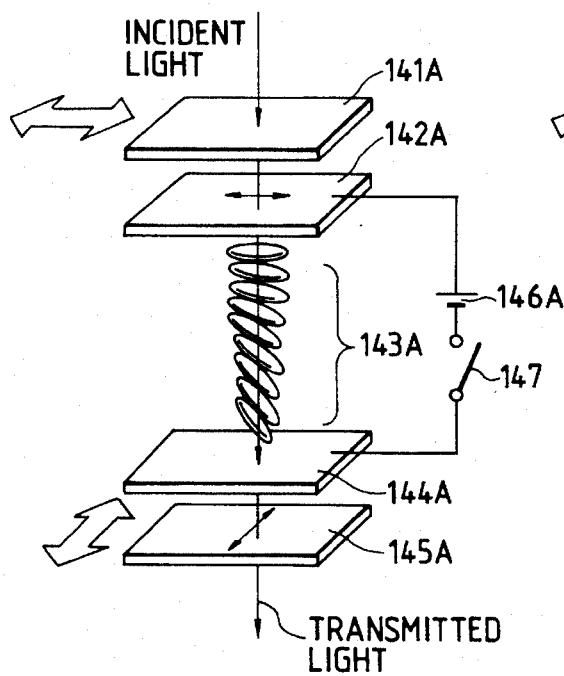
FIGS. 22A and 22B are views showing the principle of the light shielding by the liquid crystal.
Figure 22A:
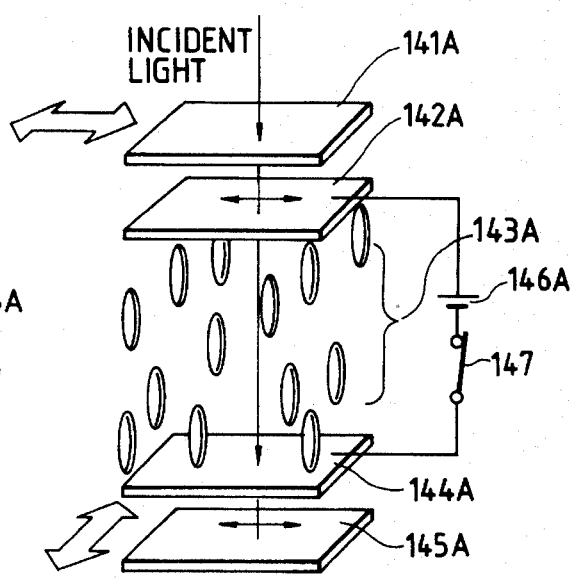

FIG. 22A and FIG. 22B are views showing the principle of light shielding when the torsion nematic type liquid crystal is used.

The torsion nematic type liquid crystal 143A has a property to cause the polarization plane to be rotated. Therefore, the polarization plate 141A and photodetection plate 145A are rotated 90 degrees for their arrangement, and if the nematic liquid crystal is produced with a torsion of 90 degrees as shown in FIG. 22B, the incident light which has been linearly polarized through the polarization plate 141A is output as the linear polarization light which is rotatively polarized to be in the direction perpendicular to the incident light when no voltage is applied to the torsion nematic liquid crystal 143A. Consequently, it is allowed to transmit through the photodetection plate 145A.

On the other hand, as shown in FIG. 22A, when a voltage is applied to the torsion nematic liquid crystal 143A, the liquid crystal 143A is orientated by electric field in the direction perpendicular to the polarization plate 141A and the photodetection plate 145A. As a result, it cannot conduct its rotatory polarization to allow itself to pass the photodetection plate 145A.

In the above-mentioned embodiment, while the torsion nematic type liquid crystal is exemplified for its description, any other type of liquid crystal can be used to obtain the same effect if only the light can be shielded or transmitted by applying to or relieving a voltage from such a liquid crystal.

Figure 23:
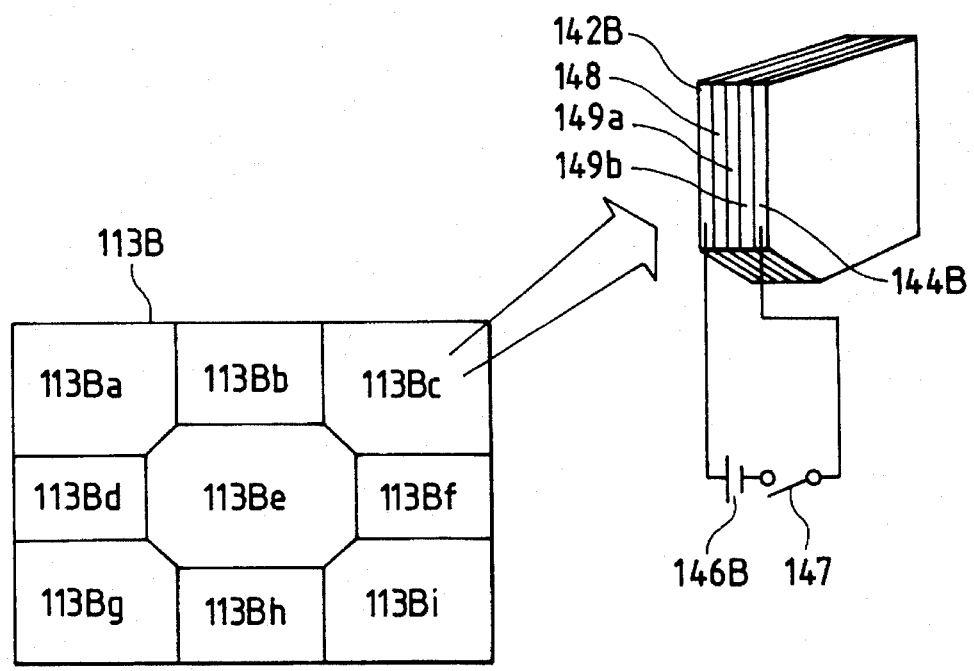
FIG. 23 is a cross-sectional view showing a light shielding portion according to the present invention using an ECD.

FIG. 23 is a cross-sectional view showing a light shielding portion using an electrochromic display (hereinafter referred to as ECD) instead of the bulk type electrooptical modulation element.

The ECD has a property that it is colored when a voltage is applied thereto as disclosed in Japanese Utility Model Laid-Open Application No. 2-138719. This property is utilized for controlling strobe light.

Each of the areas 223Ba to 113Bi of a light shielding portion 113B comprises a transparent electrode 142B, EC layer 148, solid state electrolyte layer 149, and transparent electrode 144B. In this embodiment, a WO$_3$ layer is used for the EC layer 148, and Ti$_2$O$_5$ layer 149a and Ir$_2$O$_3$/SnO$_2$ layer 149b are used for the solid state electrolyte layer 149, and from the incident light side, the WO$_3$ layer 148, Ti$_2$O$_5$ layer 149a, and Ir$_2$O$_3$/SnO$_2$ layer 149b are arranged. For the solid state electrolyte layer 149, SiO$_2$, Cr$_2$O$_3$, or the like can be used besides the above-mentioned materials. In this respect, the structure of the area 113Bc is shown in FIG. 23, but the other areas are structured in the same manner. Also, the transparent electrode 142B is arranged to face the light emission portion 112. To both the faces of the EC layer 148 and solid state electrolyte layer 149, a voltage is applied from a power source 146B through a swtich 147.

In a structure such as this, when a voltage is applied across the transparent electrodes 142B and 144B, a coloring takes place between the transparent electrodes 142B and 144B due to oxidation-reduction reaction thereby to shield flash emission.

Figure 24:
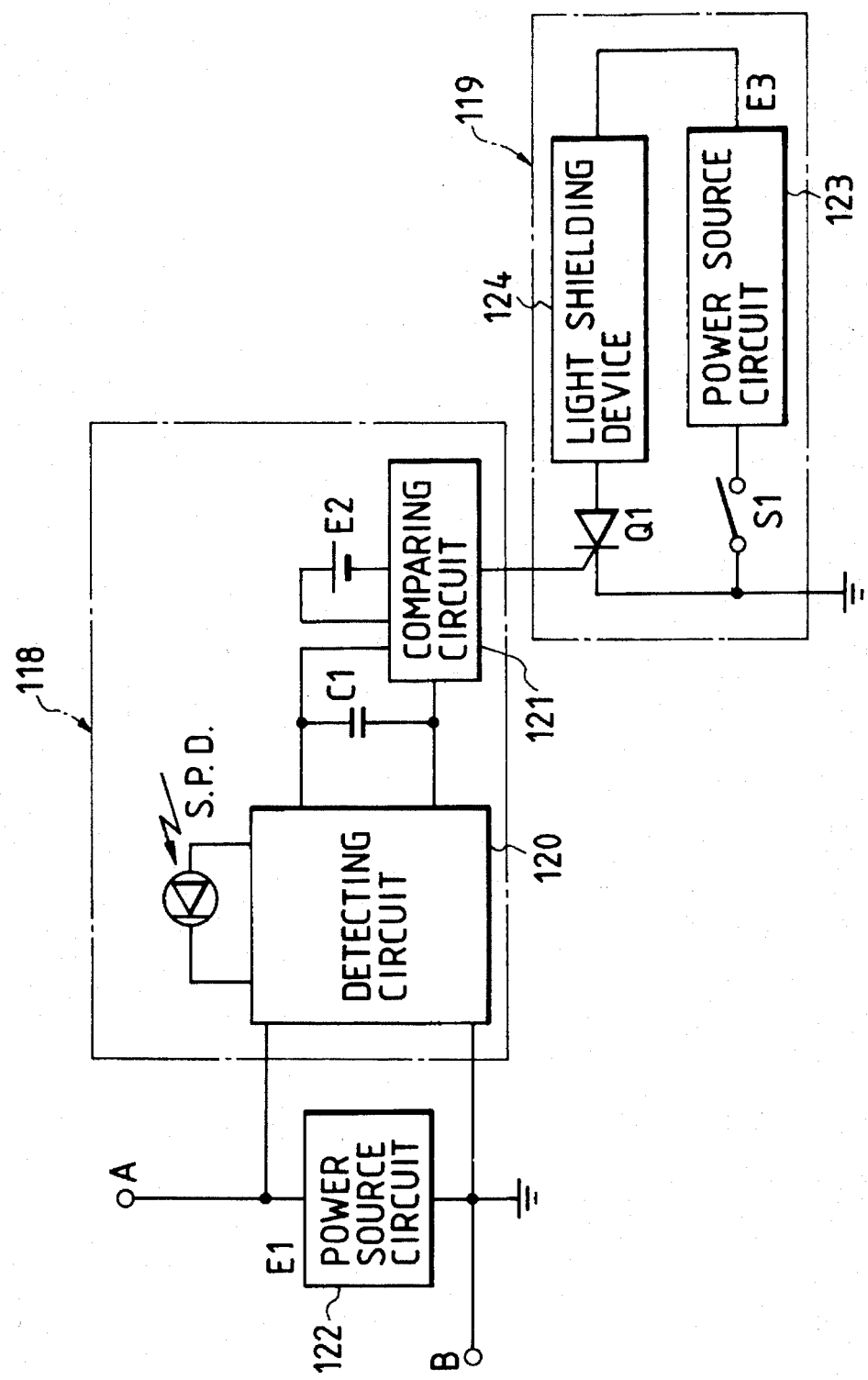
FIG. 24 is a view showing a photometric circuit and a light shielding circuit.

Subsequently, the description will be made of the light shielding control for each area of the light shielding portion 113 which is carried out on the basis of the resultant photometry for each area of the photometric portion 115. FIG. 24 shows a photometric circuit 118 for each of the areas 115a to 115i of the photometric portion 115 and a light shielding circuit 119 for each of the areas 113a to 113i of the light shielding portion 113. In this respect, the connection between one of the photometric circuit 118 for the nine areas 115a to 115i of the photometric portion 115 and one of the light shielding circuit 119 for the nine areas 113a to 113i of the light shielding portion 113 is shown, but the connections between each of the other circuits are the same, and the description thereof will be omitted. Hereunder, exemplifying the above-mentioned light shielding portion 113, the description will be made, and as the same is also applicable to the light shielding portions 113A and 113B, the descriptions thereof will be omitted.

A circuit which transmits a signal to stop the light emission when an exposure amount reaches a certain amount is publicly known by Japanese Patent Publication No. 59-6474 and others. In the present embodiment, a flash light shielding signal is generated as given below.

When light is radiated onto the S.P.D., charge is stored in a capacitor C1 by a light detection circuit 120. By this stored charge, the terminal voltage of the capacitor C is increased, and when it becomes greater than the standard voltage E2 of a comparison circuit 121, a flash light shielding signal of positive voltage is output from the comparison circuit 121 to the light shielding circuit 119 of the light shielding portion 113. Here, the standard voltage E2 is the one thereby to determine the exposure amount. In this respect, terminals A and B are connected to the photometric circuit 118 for the other area of the photometric portion, and the voltage E1 is supplied from the power source circuit 122.

The light shielding circuit 119 is a circuit for applying d.c. current voltage E3 to a light shielding device 124 from a power source circuit 123 through a switch S1 and thyristor Q1. Here, the light shielding device 124 is the light shielding member such as the above-mentioned bulk type electrooptical modulation element 143 or the liquid crystal 143A for each of the areas of the light shielding portion 113. Also, the switch S1 is a switch for suspending charge given to the thyristor Q1 subsequent to the termination of light emission from the light emission portion 112. The method of suspending charge given to the thyristor Q1 may be such that using a voltage being generated when the flash is emitted, the source voltage E3 of the power source circuit 123 is controlled with the provision of MOS-FET and others to cause the charging to be automatically stopped.

The flash light shielding signal from the comparison circuit 121 of the above-mentioned photometric circuit 118 is supplied to the gate of the thyristor Q1 of the light shielding circuit 119 to cause the thyristor Q1 to be charged. In this way, the d.c. voltage E3 of the power source circuit 123 is applied to the light shielding device 124. As described above, the flash from the light emission portion 112 is shielded from the respective light shielding devices 124.

In this respect, if the light shielding device 124 is PLZT 143, a d.c. voltage (half wavelength voltage) which changes the optical phase difference of the incident light to the PLZT 143 by $\pi$ should only be applied.

The applied voltage to the liquid crystal in this embodiment is shown as d.c. as an example, but there may be some case where a.c. is applied in order to prolong the life of the liquid crystal. In this case, a means is provided for oscillating the d.c. voltage of the power source to be applied by charging the thyristor Q1 thereby to apply an a.c. voltage to the liquid crystal light shielding device.

Figure 25:
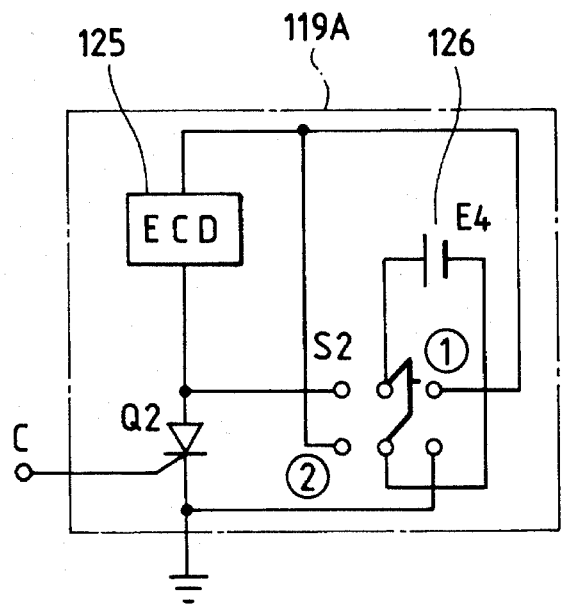
FIG. 25 is a view showing a light shielding circuit when an ECD is used.

FIG. 25 shows a light shielding circuit 119A when an ECD is used.

A terminal C is connected to the comparison circuit 121 of the above-mentioned photometric circuit 118 to supply flash light shielding signals. Usually, a switch S2 is inputted into the side ①, and when a flash light shielding signal, that is, a positive voltage, is applied to the gate of a thyristor Q2, the d.c. voltage E4 from the power source circuit 126 is applied to an ECD 15. Then, the ECD 15 is colored to shield the flash from the light emission portion 112. Subsequently, the switch S2 is inputted into the side ② after the light emission of the light emission portion 112 is terminated, a converted voltage is applied to the ECD 15 to decolor the ECD 15.

Besides the method described in the above-mentioned embodiment, any methods can be used for the shielding circuit if only a method is such that a light shielding signal is given to the light shielding portion when an exposure amount reaches a certain amount and then a voltage is applied to the light shielding device by the shielding signal thus provided. Also, the power source circuits 123 and 126 are arranged independent of the power source circuit 122, it may be possible to make them common if only an adjustment can be made to allow the light shielding device to operate accordingly.

Thus, by dividing a field into a plurality of segmented photometric areas for the required photometry to shield the flash from the light emission portion in accordance with their photometric results of the plural emission areas corresponding to the plural irradiation areas of the field with respect to each of the segmented photometric areas, it becomes possible to conduct a flash photography with correct exposure for a plurality of subjects having different film-to-subject distances in a field.

In this respect, while the examples are given in the above-mentioned embodiment, in which a bulk type electrooptical modulation element, liquid crystal, or ECD is used for a light shielding member of the light shielding portion, the member is not limited to those exemplified in the above-mentioned embodiment. Any member may be used if only it can control flash electrically to shield it.

Also, in the above-mentioned embodiment, the photometric portion 115 and light shielding portion 113 are divided into nine areas, but the number of divisions and the shape thereof are not limited to those exemplified in the above-mentioned embodiment.

In a structure of the above-mentioned embodiment, the light emission portion 112 and light shielding portions 113, 113A, and 113B constitute flash lighting means, the photometric portion 115, photometric means, and the light shielding circuits 119 and 119A, controlling means, respectively.

As described above, according to the present invention, the light shielding signals are output on the basis of the photometric results of the reflection light of the flash reflected from the field, and in accordance with this light shielding signal, the flash from the light emission position is almost completely shielded. Therefore, even when there are a plurality of subjects having different film-to-subject distances in the field, a flash photography can be conducted for all of them with correct exposure.

Also, the field is divided into a plurality of segmented photometric areas for photometry, and on the basis of their photometric results, the flash from the light emission portion is shielded for the plural emission areas corresponding to the plural irradiation areas of the field. It is therefore possible to conduct a flash photography with even better exposure for a plurality of subjects having different film-to-subject distances in the field.

Furthermore, the segmented configuration of the photometric area and the segmented configuration of the emission area are arranged to be of a same shape. Hence making it possible to improve the accuracy of exposure when a flash photography is conducted for a plurality of subjects having different film-to-subject distances in a field.

The applicants hereof have proposed a flash lighting apparatus for a camera, in which a field is divided into a plurality of irradiation areas to adjust the irradiating amount of light from a light emission portion for each of the irradiation areas for performing the irradiation.

For a flash lighting apparatus of the kind, an irradiating amount of light adjusting member such as a liquid crystal or electrochromatic display is arranged in front of a light emission portion to adjust the amount of light passing each for the irradiation areas in accordance with the spatially distributional state of a plurality of subjects: so that all the subjects are illuminated to give correct exposures to all of the subjects.

Now depending on photographing scenes, there are some cases where a flash photography is taken but not all the subjects are provided with correct exposures. For example, a correct exposure is given only to the main subject and the subjects which are located farther behind the main subject should be photographed under-exposure so as to enable the main subject to stand out from its background in the flash photography to be taken.

Also, there are some cases where a flash photography is conducted with a shutter speed quicker than the time required for a liquid crystal or an ECD to arrive at an amount actually needed after a voltage has been applied. Thus the adjustment is yet to be made to obtain a sufficient amount of irradiating light for such a flash photography.

An embodiment will be set forth below with a view to solving this problem.

FIG. 26 is a block diagram showing the structure of an embodiment.

In FIG. 26, a reference numeral 311 designates a selection device to select whether or not the adjustment of an irradiating amount of light is conducted for each of the plural irradiation areas of a field. This selection is made either in accordance with the result of selection by a photographer for the irradiation light amount adjusting mode or the normal irradiation mode by the selection member which will be described later, or in accordance with the judgment whether the camera 313, on which the segmented irradiation type flash apparatus 312 is mounted is, a camera suited for the segmented irradiation type flash apparatus 312 or not.

A reference numeral 314 designates an automatic selection device comprising a photometric portion 315 and a discriminating portion 316. The photometric portion 315 serves to measure the time from the half depression of a shutter release button (not shown) to the full depression thereof. The discriminating portion 316 transmits a signal which authorizes an irradiation light amount adjustment to the selection device 311 when the measured time by the photometric portion 315 is longer than a predetermined time, and if the measured time is shorter than the predetermined time, a signal which does not authorize any adjustment of irradiation light amount is transmitted to the selection device 311 even in the case where the photographer has selected the irradiation light amount adjusting mode.

A reference numeral 317 designates a microcomputer (hereinafter referred to as CPU) which performs the preliminary light emission control of the segmented irradiation type flash apparatus 312, the photometric control at the time of a preliminary light emission, the regular light emission control, the arithmetic control of irradiation amount of light, and the like, and at the same time, provides a shutter driving timing and the output timing of X contacting signal for allowing the regular light emission to be started for a CPU 318 on the camera side.

A reference numeral 319 designates a light emission driving circuit for driving a light emission bulb 320; 321, a photometric portion for measuring the exposure amount of flash at the time of a preliminary light emission; and 322, a power source for the segmented irradiation type flash apparatus 312; and further, 323, the arithmetic portion to calculate the segmented irradiation amount of light which has a memory 323a to store temporarily the exposure amount measured by the photometric portion 321 for working out the irradiation amount of light for each of the irradiation areas at the time of regular light emission on the basis of the photometric result at the time of the preliminary light emission.

A reference numeral 324 designates an irradiating light amount adjusting portion having a plurality of emission areas corresponding to a plurality of irradiation areas of a field, which controls an emitting light amount adjusting member 324a comprising a liquid crystal, an ECD, or the like in accordance with the irradiation amount of flight for each of the irradiation areas worked out by the segmented irradiation light amount arithmetic portion 323, and adjusts the emitting light amount from the light emission bulb 320 for each of the emission areas; 325, a temperature detector for detecting environmental temperatures; and 326, a voltage changing circuit for varying the voltage which is applied to the emitting light amount adjusting portion 324 in accordance with the environmental temperatures detected by the temperature detector 325.

When a light emission instruction is received from the CPU 318 on the camera side, the selection device 311 communicates with the CPU 317 in the segmented irradiation type flash apparatus 312 as to whether the irradiating light amount is adjusted or not. In this respect, since the light emission instruction from the camera side must be transferred on a moment the release is given, the contact point for transmitting or receiving signals between the segmented irradiation type flash apparatus 312 and the camera 313 is different from the one used for conventional technique.

When the CPU 317 in the segmented irradiation type flash apparatus 312 receives a selection signal from the selection device 311 to adjust the irradiating light amount, it communicates with the CPU 318 in the camera 313 on the timing of the shutter driving at the time of the regular light emission and the X contact output signal and transfers the preliminary light emission instruction to the light emission driving circuit 319. Further, the CPU 317 transmits a photometric instruction to the photometric portion 321 and an arithmetic instruction to the segmented irradiating light amount arithmetic portion 323 for the timing to start the operation of the emitting light amount adjusting portion 324.

In this way, the light emission driving circuit 319 performs the preliminary light emission of the flash bulb 320, and the photometric portion 321 measures the reflection light from the field resulting from the preliminary light emission. The segmented irradiating light amount arithmetic portion 323 stores the photometric data from the photometric portion 321 in the memory 323 temporarily. When an arithmetic instruction is issued from the CPU 317, this portion calls out the photometric data from the memory 323a to calculate the irradiating light amount for each of the irradiation areas at the time of regular light emission (that is, the time when the X contact signal is on) and the timing for starting the operation of the emitting light amount adjusting portion 324. Then, with such a timing, the emitting light amount adjusting portion 234 is actuated.

In this respect, if no irradiating light amount adjustment is conducted, only the regular light emission is executed in accordance with the X contact signal as in the case of adopting a conventional flash apparatus.

The emitting light amount adjusting portion 324 controls the emitting light amount adjusting member 324a such as a liquid crystal or an ECD in accordance with the irradiation amount of light for each of the irradiating areas worked out by the segmented irradiating light amount adjusting arithmetic portion 323. The emitting light amount adjusting member 324a is driven by an applied voltage, but its operational characteristics such as response time are varied by the environmental temperatures. Thus, the voltage changing circuit 326 causes the applied voltage to be varied in accordance with the environmental temperatures detected by the temperature detector 325 to enable the emitting light amount adjusting member 324a to control the maintenance of given operational characteristics.

In this respect, while the discriminating portion 316, photometric portion 321, and temperature detector 325 are arranged in the segmented irradiation type flash apparatus 312 in this embodiment, it may be possible to arrange them in the camera 313, or utilize a temperature detecting device which is usually provided for a camera 313 instead of this particular temperature detector 325.

FIG. 27 is a cross-sectional view showing a segmented irradiation type flash apparatus according to the present invention.

A light emission bulb 320 comprises a light emission bulb 320a for preliminary light emissions and a light emission bulb 320b for regular light emissions. Flash rays of light emitted from these light emission bulbs 320a and 320b are partially reflected by a reflection mirror 331 to be externally emitted through a emitting light amount adjusting member 324a and Fresnel lens 332.

The emitting light amount adjusting member 324a is divided into nine emission areas F1 to F9 as shown in FIG. 27, and the transmitting amount of light from the light emission bulb 320a and 320b is controlled for each of the light emission areas F1 to F9. The flash reflection rays of light from the field are induced to the photometric element 321b which is formed by a silicon photodiode (S.P.D.) through a lens 321a. These lens 321a and photometric element 321b constitute the photometric portion 321. The photometric element 321b is divided into nine photometric areas f1 to f9 as shown in FIG. 27 to conduct its photometry for each of the photometric areas f1 to f9. In this respect, these segmented photometric areas f1 to f9 correspond to the segmented light emission areas F1 to F9 of the emitting light amount adjusting member 324a.

FIG. 28 is a flowchart showing the adjusting operation of the irradiation amount of light, and in accordance with this flowchart, the operation of the embodiment will be described.

The operation is started with the release operation of the camera 313, and in steps S102 to S104, the selection processes described above will be executed for the aforesaid selection device 311. At first, in the step S102, the camera 313 equipped with a segmented irradiation type flash apparatus 312 is examined to discriminate whether such a camera is suited for the irradiating light amount adjustment or not. Then, if the camera is found to be suitable for the irradiating light amount adjustment, the CPU 318 in the camera 313 issues the light emission instruction to the segmented irradiation type flash apparatus 312 at the time of shutter releasing. At this juncture, if no light emission instruction is received by the segmented irradiation type flash apparatus 312, it is determined that the camera is a conventional one which cannot execute any irradiating light amount adjustment, and the process will proceed to step S121 to output an X contact signal of the camera to the flash apparatus 312 in the same manner as in the conventional operation for the execution of a regular light emission.

When the camera can execute the irradiating light amount adjustment, whether the selection member has selected the irradiating light amount adjustment mode or not is determined in step S103. If the selection is found to be the usual irradiation mode which requires no irradiating light amount adjustment, then the process will proceed to step S131 to output the X contact signal of the camera to the flash apparatus 102 for the execution of a regular light emission.

When the irradiating light amount adjustment mode has been selected, whether any segmented irradiation is needed or not is determined in step S104. If it is found as a result of the judgment of the above-mentioned discriminating portion 316 that although the irradiating light amount adjustment mode is selected, the time between the half depression of the shutter release button and its full depression is shorter than a predetermined time and the current photography is an urgent one, and that any segmented irradiation is not required because a certain amount of time is needed before starting photographing, then the process will proceed to step S141 to output the X contact signal of the camera to the flash apparatus 312 for the execution of a regular light emission.

As a result of a selection for the selection device 311, if all the steps S102 to S104 are affirmed an irradiating light amount adjustment instruction is transmitted from the selection device 311 to the CPU 317 in step S105, and the CPU 317 receiving the irradiating light amount adjustment instruction transmits the control signals for timing the shutter driving and X contact signal outputting to the CPU 318 in the camera 313. Here, the time when the control signal is output is given as T0, and it is assumed that the shutter driving is performed after a time T3 from the time T0 and the X contact signal output, after a time T4 from the time T0, respectively. Then, in step S106, a preliminary light emission instruction is issued to the light emission driving circuit 319 after a time T1 from the time T0 to start the preliminary light emission, and in step S107 to follow, a photometric instruction is issued to the photometric portion 321 to measure the reflection light of preliminary light emission photometrically. This photometric data is output to the segmented irradiating light amount arithmetic portion 323 for its storage in the memory 323a. In step S108, an arithmetic instruction is issued to the segmented irradiating light amount arithmetic portion 323 after the passage of time T2 from the time T0 to work out the irradiation amount of light for each of the irradiation areas on the basis of the photometric data stored in the memory 323a. Further, on the basis of the irradiation amount of light for each of the irradiation areas, the starting timing is calculated for the light amount adjustment operation for each of the emission areas F1 to F9 of the emitting light amount adjusting portion 324. Then, by the calculated timing, the operation starting instruction is issued from the segmented irradiating light amount arithmetic portion 323 to the emitting light amount adjusting portion 324 thereby to allow the emitting light amount adjusting portion 324 to start the light amount adjustment operation.

On the other hand, in step S111, the CPU 318 in the camera 313 having received the control instruction from the segmented irradiation type flash apparatus 312 starts driving shutter in step S112 after the passage of time T3 and outputs the X contact signal in step S113 after the passage of time T4.

In this respect, for a kind of camera in which the output timing of the X contact signal is established by the start of shutter driving, it should be good enough if only the time for the shutter to be driven is set so that the X contact signal may be output after the passage of time T4 from the time T0.

Also, when an irradiating light amount adjustment has been executed in the above-mentioned procedures, an irradiating light amount adjustment execution lamp provided for the segmented irradiation type flash apparatus 312 is illuminated for several seconds to enable the photographer to recognize that the required irradiating light amount adjustment is completed. It may be possible to display the execution of the irradiating light amount adjustment on the display device in the finder.

Figure 29:
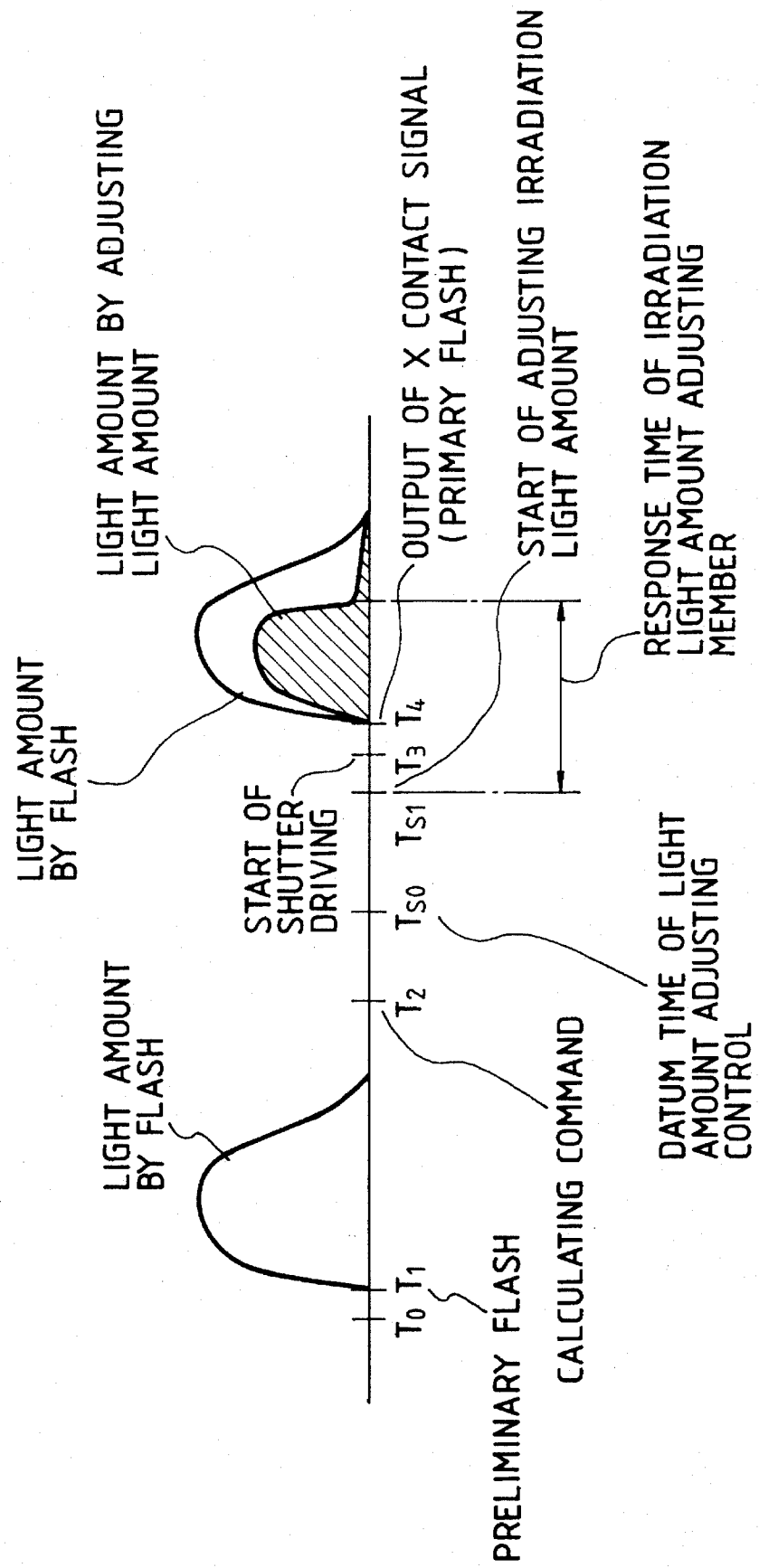
FIG. 29 is a timing chart showing the timing required for a preliminary emission, regular emission, and irradiation light amount adjusting control.

FIG. 29 is a timing chart showing the timing of a preliminary light emission, regular light emission, and irradiating light amount adjustment control.

At first, at the time T0, control signals, that is, the timing signals for shutter driving and X contact signal outputting, are output from the CPU 317 in the segmented irradiation type flash apparatus 312 to the CPU 318 in the camera 313. Now, this time T0 is assumed to be an original time. After the passage of time T1 from the time T0, the preliminary light emission and photometric instruction are output. Also, after a time T2, the arithmetic instruction for the segmented irradiation amount of light is output. On the other hand, after the passage of T3 from the time T0, the shutter driving is started, and after a time T4, the X contact signal is output.

Also, after the passage of time TS0 from the time T0, an original time for the irradiating light amount adjustment is set. This original time TS0 is a time enabling the emitting light amount adjusting member 324a to complete its response and shield the transmission amount of light substantially if the emitting light amount adjusting portion 324 is actuated at this time. Making this time TS0 as reference, the starting time TS1 of the irradiating light amount adjustment is determined. In this respect, the starting time TS1 of the irradiating light amount adjustment corresponds to the irradiation amount of light for each of the irradiation areas worked out by the segmented irradiating light amount arithmetic portion 323, and differs by each of the emission areas F1 to F9 of the emitting light amount adjusting member 324a.

In this way, it is possible to adjust the irradiation amount of light accurately even with an emitting light amount adjusting member which has a long response time such as a liquid crystal or an ECD.

Figure 30:
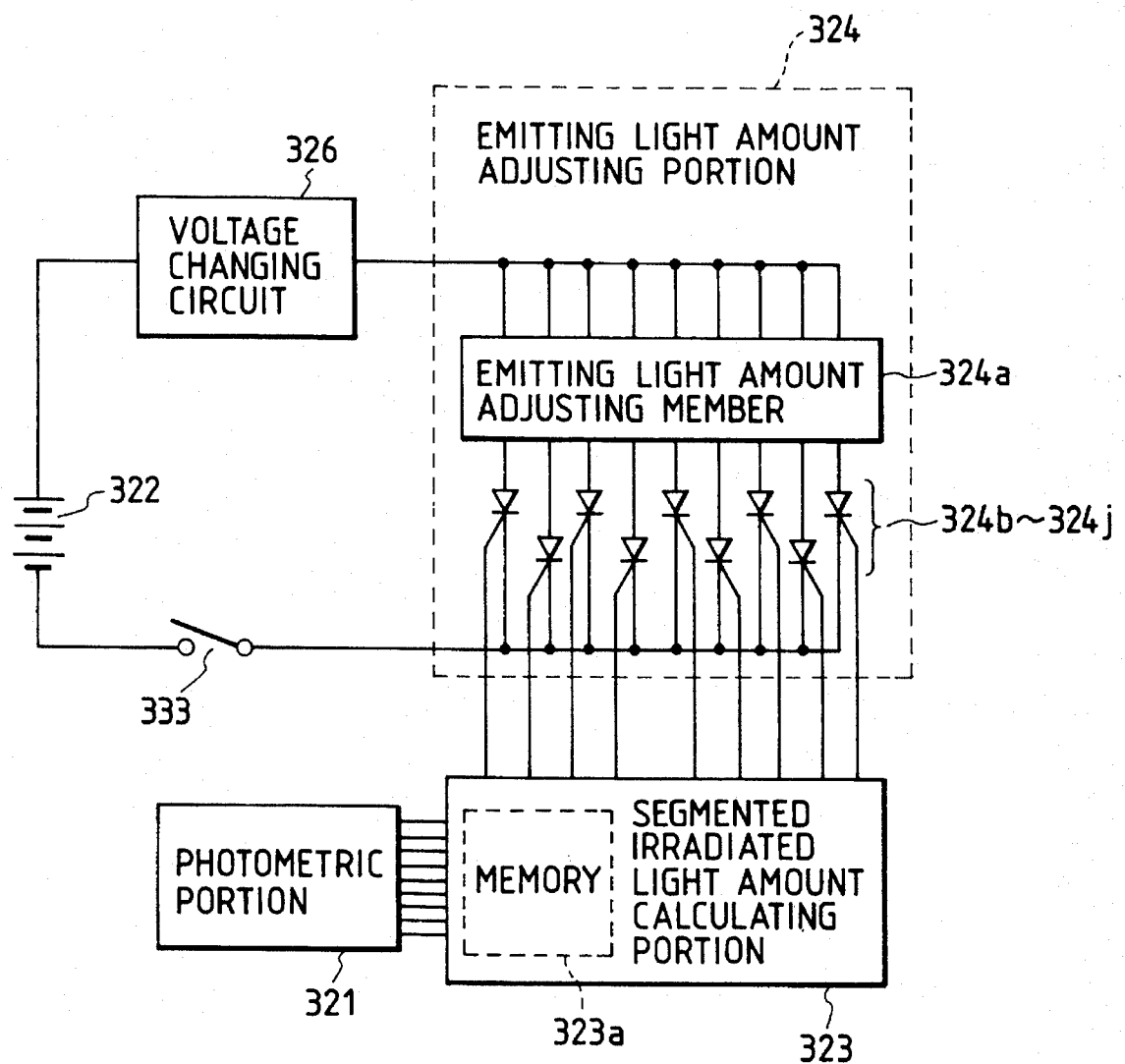
FIG. 30 is a circuit diagram of the irradiation light amount adjustment controller.

FIG. 30 is a circuit diagram of an irradiating light amount controller.

A driving power for the emitting light amount adjusting member 324 is supplied from a power source 322 through a voltage changing circuit 326, each of the emission areas F1 to F9 of the emitting light amount adjusting member 324a, thyristors 324b to 324j provided for each of the areas, and a reset switch 333. As described above, the photometric portion 321 conducts its photometry for each of the nine photometric areas f1 to f9 at the time of preliminary light emission, and stores the photometric data for each of the photometric areas f1 to f9 in a memory 323a. The segmented irradiating light amount arithmetic portion 323 reads these photometric data at the time of preliminary light emission from the memory 323a to calculate the required operation time for each of the emission areas F1 to F9 of the light amount adjusting member 324a, that is, the light amount adjustment starting time, so that the transmitting amount of light can be controlled completely for each of the emission areas when its regular emission is executed.

As described above, there may be some cases where the response time of the emitting light amount adjusting member 324a such as a liquid crystal or an ECD is longer than the flash emitting time. In such a case, it is necessary to start the operation of the emitting light amount adjusting member 324a earlier than the start of the regular light emission for the perfect execution of the light amount control at the time of the regular light emission.

The segmented irradiating light amount arithmetic portion 323 applies a positive voltage to the gates of the thyristors 324b to 324j corresponding to each of the emission areas F1 to F9 at the starting time of light amount adjustment for each of the emission areas F1 to F9 of the emitting light amount adjusting member 324a to energize the thyristors 324b to 324j. Thus, a voltage is applied to each of the emission areas F1 to F9 of the emitting light amount adjustment member 324a. In this respect, if the emitting light amount adjusting member 324a is a liquid crystal, it is desirable to convert the d.c. voltage into the square wave because although with the application of a d.c. voltage it can be driven, it tends to reduce its life.

When the irradiating light amount adjustment control is completed, a reset switch 333 is turned off to deenergize all the thyristors 324b to 324j. Hence enabling the emitting light amount adjusting member 324a to be returned to its initial state, and the transmittance of each of the irradiation areas F1 to F9 becomes even.

Figure 31:
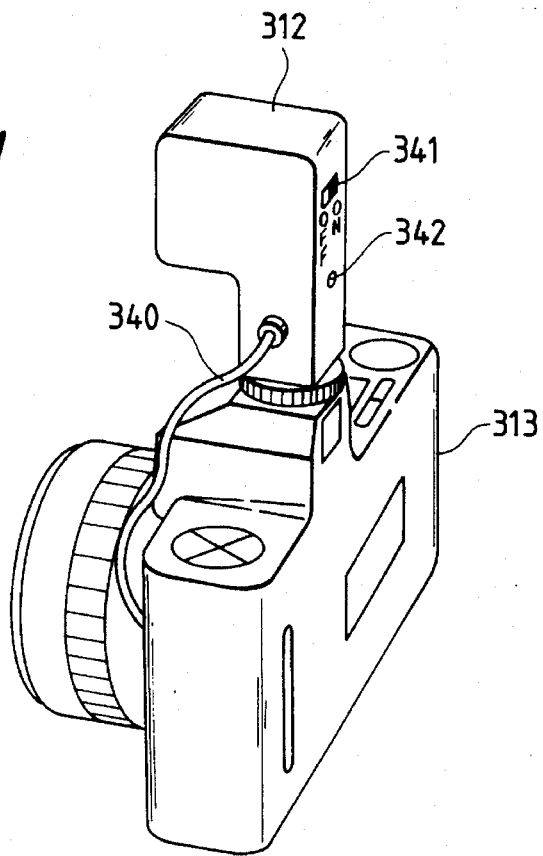
FIG. 31 is a view illustrating the external appearance of a segmented irradiation type flash apparatus mounted on a camera.

FIG. 31 is the external view of a segmented irradiation type flash apparatus according to the present invention, which is mounted on a camera.

Between the segmented irradiation type flash apparatus 312 and the camera 313, the transmission and reception of signals such as an emission instruction, timing signals of the shutter driving and X contact signal outputting, the time between the half depression and full depression of the shutter release button are performed, necessitating the provision of many contacting points.

Therefore, from the side of the segmented irradiation type flash apparatus 312 to the front face of the camera 313 on the left-hand side, a dedicated cable 340 is provided. If there is a method whereby to conduct the transmission and reception of all the signals perfectly, any methods can be employed as a matter of course.

In this respect, a reference numeral 341 designates the selection device with which the irradiating light amount adjusting mode described above or the usual irradiation mode can be selected, and also, 342, the irradiating light amount adjustment execution lamp.

Figure 32:
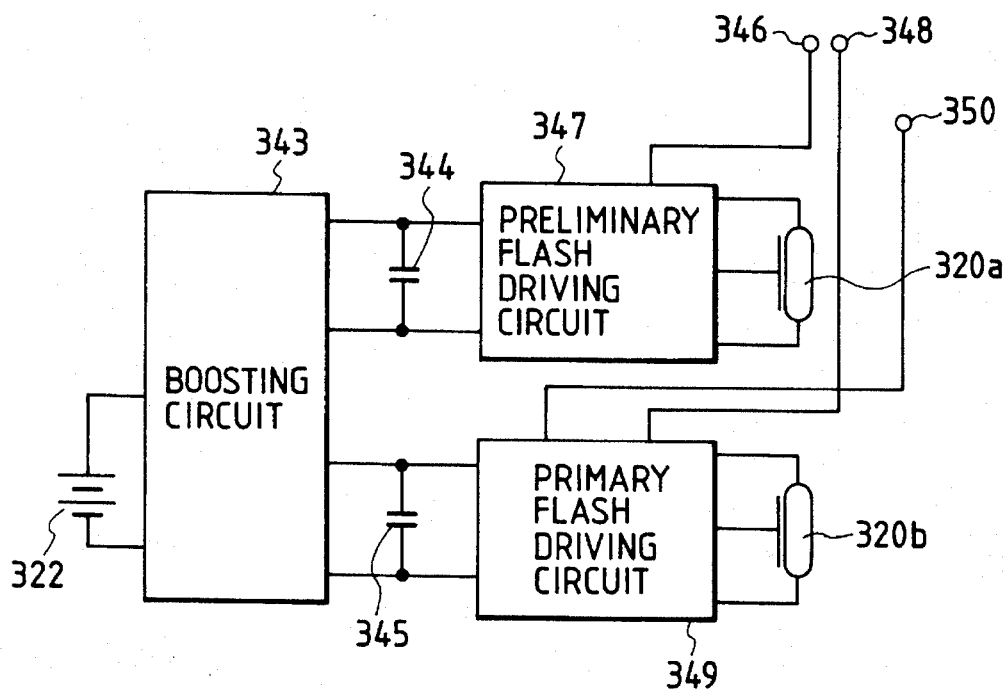
FIG. 32 is a circuit diagram of a light emission portion.

FIG. 32 is a circuit diagram of a light emission portion.

The voltage of a power source 322 is boosted by a boosting circuit 343 to apply a voltage to a capacitor 344 for preliminary light emission and a capacitor 345 for regular light emission. When a preliminary light emission instruction is issued from the CPU 317 in the segmented irradiation type flash apparatus 312 to the preliminary flash driving circuit 347 through a terminal 346, a preliminary flash bulb 320a is triggered to flash. Also, when the X contact signal is supplied from the camera 313 to the regular flash driving circuit 349 through a terminal 348, a regular flash bulb 320b is triggered to flash.

Also, a reference numeral 350 designates a TTL light adjusting terminal thereby to enable the suspension of the regular flashing by a TTL light adjustment through the camera 313.

Figure 33:
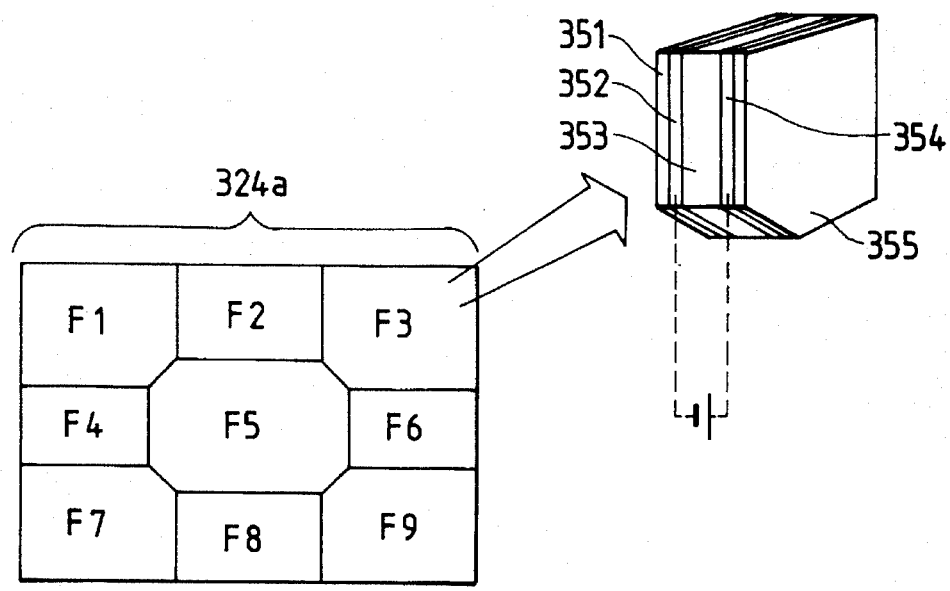
FIG. 33 is a view showing an emitting light amount adjusting member.

FIG. 33 is a view showing the emitting light amount adjusting member 324a.

The emitting light amount adjusting member 324a is divided into the nine emission areas F1 to F9 as described above, and each of the emission areas F1 to F9 is allowed to start the light amount adjustment control at the time worked out by the segmented irradiating light amount arithmetic portion 323 on the basis of the photometric data for the corresponding photometric areas f1 to f9 of the photometric portion 321.

Each of the emission areas F1 to F9 of the emitting light amount adjusting member 324a comprises a polarization plate 351, transparent electrode 352, liquid crystal 353, transparent electrode 354, and photodetection plate 355 sequentially from the light emission portion side. In FIG. 33, one of the nine emission areas F1 to F9 is shown, but all the others are the same.

Figure 34A:
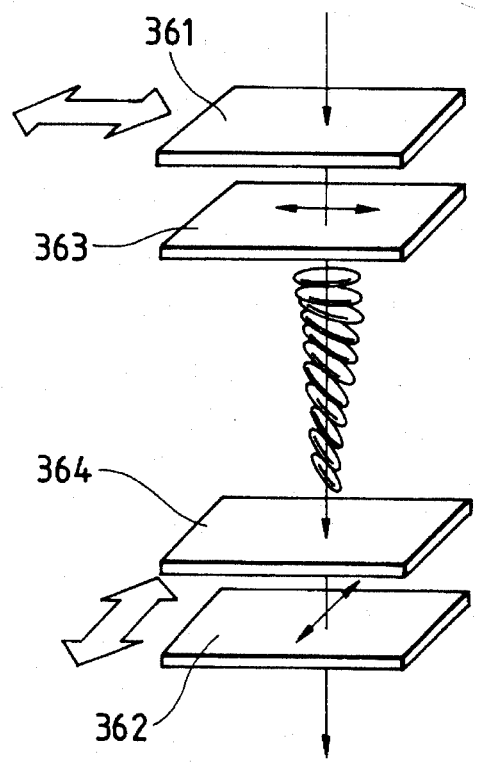
FIGS. 34A and 34B are views illustrating the light amount adjusting principle when a torsion nematic type liquid crystal is used as the emitting light amount adjusting member.
Figure 34B:
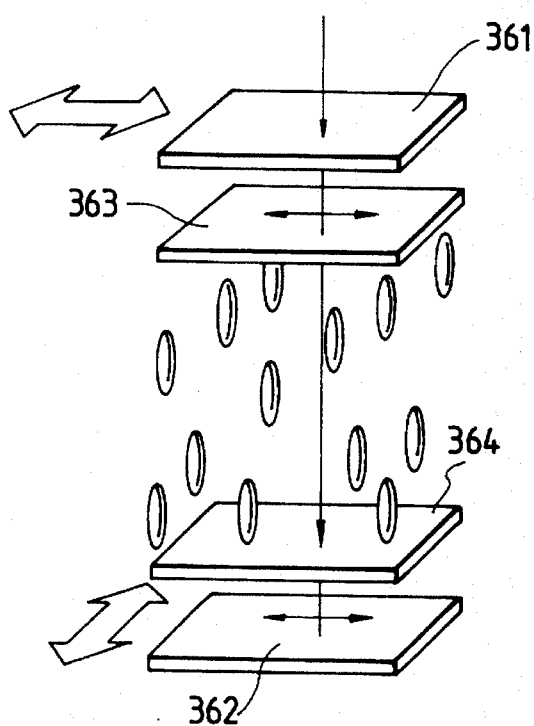

FIG. 34A and FIG. 34B are views illustrating the principle of the light amount adjustment when a torsion nematic type liquid crystal is used for the emitting light amount adjusting member 324a. FIG. 34A is a view when there is no application of voltage while FIG. 34B is a view when a voltage is applied.

The torsion nematic type liquid crystal has a property to cause the polarization plane to be rotated. As shown in FIG. 34A, the polarization plate 361 and photodetection plate 362 are arranged with a rotation of 90 degrees and the nematic liquid crystal is produced with a torsion of 90 degrees. Then, when there is no voltage application across the transparent electrodes 363 and 364, the incident light, which is a linearly polarized light by being transmitted through the polarization plate 361, is output rotatively as the linearly polarized light in the direction perpendicular to the incident light. As a result, it can be transmitted through the photodetection plate 362. However, when a voltage is applied across the transparent electrodes 363 and 364, the liquid crystal is orientated by the electric field in the direction perpendicular to the polarization plate 361 and photodetection plate 362. Consequently, it cannot be of any rotatory light, and is not allowed to transmit through the photodetection plate 362.

In the present embodiment, while an example is shown, in which a torsion nematic type liquid crystal is used as the emitting light amount adjusting member 324a, the other types of liquid crystals may be used for the emitting light amount adjusting member 324a if only they can transmit or shield light by the application of a voltage or releasing thereof.

Figure 35A:
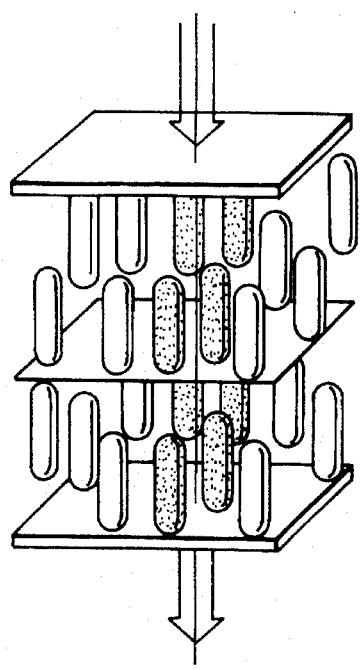
FIGS. 35A and 35B are views illustrating the light amount adjusting principle when a guest-host type liquid crystal is used as the emitting light amount adjusting member.
Figure 35B:
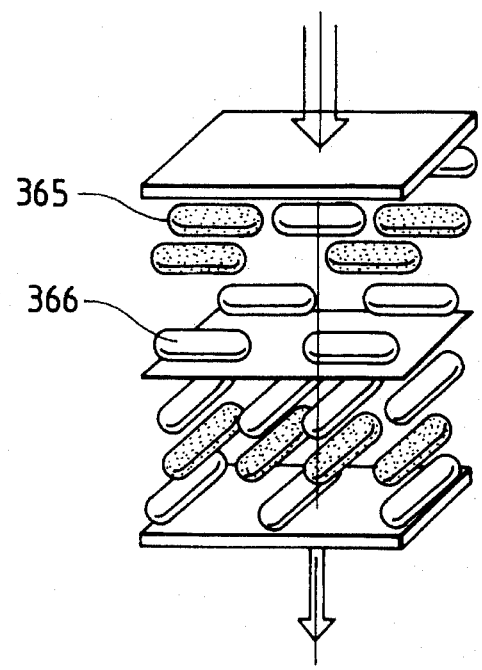

FIG. 35A and FIG. 35B are views illustrating the principle of the light amount adjustment when a guest-host type liquid crystal is used for the emitting light amount adjusting member 324a. FIG. 35A is a view when there is no application of voltage while FIG. 35B is a view when a voltage is applied.

The dichromatic dye 365 which has anisotropy in the visible light absorption in the longer side direction and shorter side direction of a photographing image plane is dissolved in a liquid crystal having a specific disposition and the dichromatic dye 365 is arranged in parallel with a liquid crystal molecule 366. In this state, when the arrangement of the liquid crystal molecule 366 is changed by applying a voltage, the molecular arrangement of the dichromatic dye 365 can be changed. In the present embodiment, the structure is arranged with a liquid crystal having a negative conductive anisotropy, and there is adopted a nematic type liquid crystal of a type such that when no voltage is applied, its disposition is made in the direction of the optical axis, and if a voltage is applied, it is made in the direction perpendicular to the optical axis. In this respect, the disposition is practically required to be in one direction when a voltage is applied. Therefore, when no voltage is applied, it is slightly inclined from the optical axis.

Also, in the present embodiment, the color of the dichromatic dye 365 is black to control the irradiating light amount adjustment by the application of a voltage or releasing thereof. In other words, when no voltage is applied, the dichromatic dye 365 is disposed in the direction of the optical axis, the transmitting light is scarcely colored when transmitted. However, since the dichromatic dye 365 is disposed in the direction perpendicular to the optical axis when a voltage is applied, the transmitting flash light is colored black. Thus, the amount of light is extremely reduced.

For this method, no polarization plate is used. As a result, it is possible to prevent the transmitting amount of flash from being reduced in the emitting light amount adjusting member 324a when no light amount adjustment control is conducted.

Figure 36:
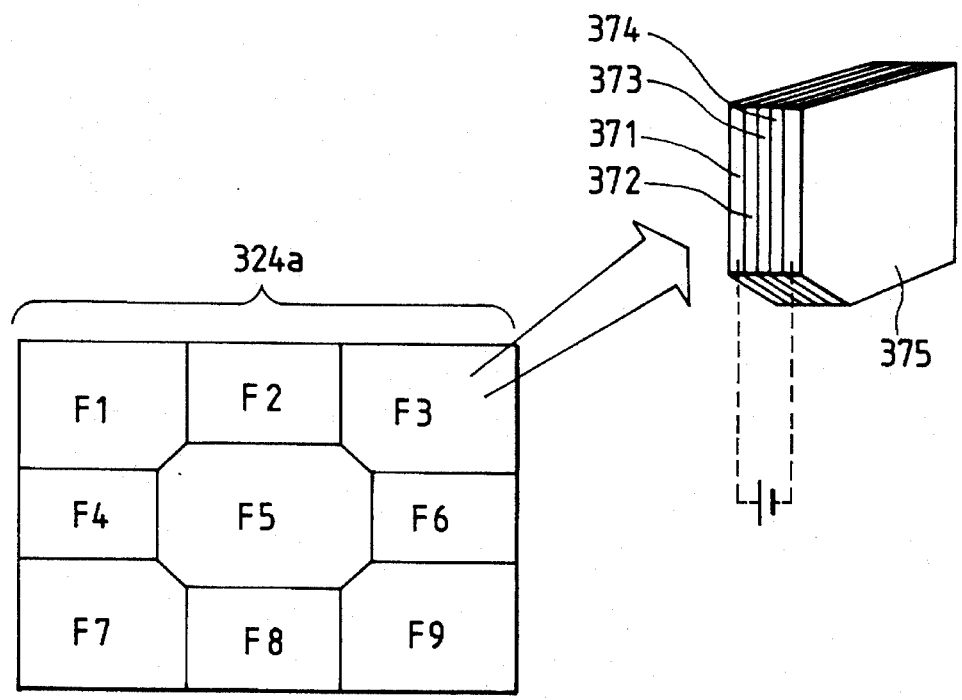
FIG. 36 is a cross-sectional view showing a case where an ECD is used for the emitting light amount adjusting member.

FIG. 36 is a cross-sectional view showing the case where an ECD is used for the emitting light amount adjusting member 324a.

The ECD has a property to be colored when a voltage is applied as disclosed in Japanese Utility Model Laid-Open Application No. 2-138719, for example, and this property is utilized for the light amount adjustment control.

For each of the emission areas F1 to F9 of the emitting light amount adjusting member 324a, a transparent electrode 371, EC layer 372, solid state electrolyte layers 373 and 374, transparent electrode 375 are arranged sequentially from the light emission portion side. In this respect, one of the nine emission areas F1 to F9 is shown in FIG. 36, but all the other emission areas are structured in the same manner.

When a voltage is applied across the transparent electrodes 371 and 375, there occurs a coloration between the transparent electrodes 371 and 375 due to oxidation-reduction reaction. Thus enabling the adjustment of the transmitting amount of light. In the present embodiment, $WO_3$ is used for the EC layer 372, $Ta_2O_5$ and $Ir_2O_3/SnO_2$ are used for the solid state electrolyte layers 373 and 374. Then, there are arranged from the incident light side the $WO_3$ layer, $Ta_2O_5$ layer, and $Ir_2O_3/SnO_2$ layer. For the solid state electrolyte layer 373, $SiO_2$, $Cr_2O_3$, or the like can be used besides the above-mentioned materials.

Figure 37:
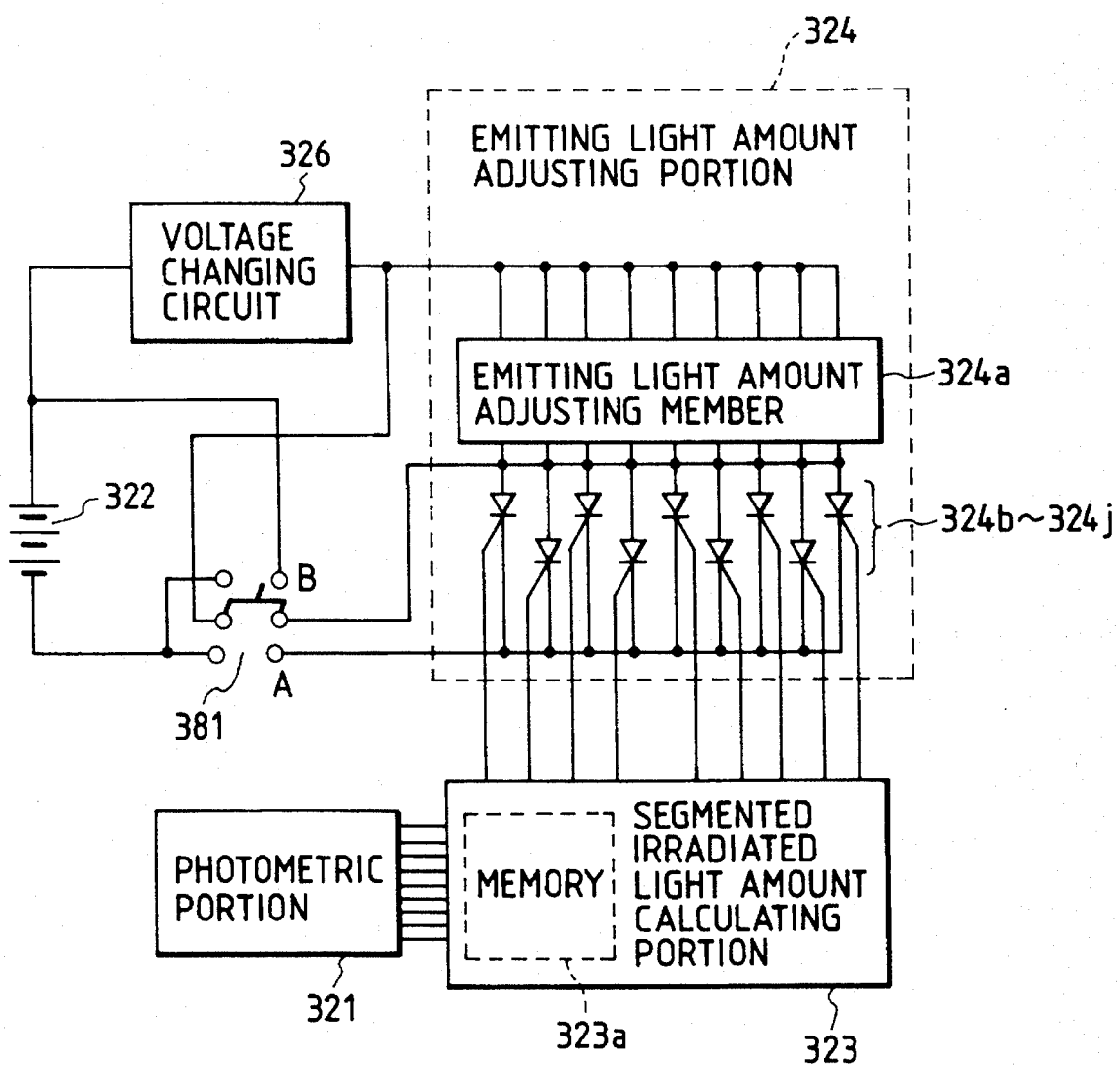
FIG. 37 is a view showing a controlling circuit when an ECD is used.

In case of this ECD, unless an inverted voltage is applied, it is not returned to the initial state. Therefore, its light amount adjustment is performed by a circuit shown in FIG. 37.

The switch 381 is always inputted on the A side, and is inputted on the B side for resetting to apply an inverted voltage to each of the emission areas F1 to F9 of the emitting light amount adjusting member 324a for decoloration.

Now, the camera equipped with the apparatus is a camera suited for the irradiating light amount adjustment, and the irradiating light amount adjustment mode is set by the selection device 341, and it is determined by the discriminating portion 316 that the time between the half and full depressions of the shutter release button is longer than a predetermined time so that the irradiating light amount adjustment is possible. Thus, the irradiating light amount for each of the irradiation areas is calculated on the basis of the photometric data for each of the photometric areas measured photometrically by the photometric portion 321 at the time of the preliminary light emission. In this way, the light amount adjustment is arranged to be started for each of the emission areas of the emitting light amount adjusting portion 324. As a result, it is now possible to conduct a flash photography without adjusting irradiating light amount as well as to perform it as intended by a photographer in accordance with a particular photographing scene. Also, even with a irradiating light amount adjusting member 324a such as a liquid crystal or an ECD having a longer response time, it is possible to conduct a flash photography with a rapid shutter speed. Moreover, when the apparatus is mounted by mistake on a camera which does not respond to the light amount adjustment control and a flash photography is still attempted as it is, such an erroneous operation can be prevented.

In the above-mentioned embodiment, while an example is shown, in which the present invention is applied to a single lens reflex camera having no segmented irradiation type flash apparatus, it may be possible to apply it to a single lens reflex camera or a compact camera with a segmented irradiation type flash apparatus being incorporated therein, and to obtain the same effects.

In a structure according to the above-mentioned embodiment, the light emission driving circuit 319 and light emission bulb 320 constitute light emission means; the emitting light amount adjusting portion 324 and emitting light amount adjusting member 324a, light amount adjustment means; the selection device 311 and automatic selection device 314, discriminating portion; the selecting member 341, an external operation member; the photometric portion 321, photometric means; the temperature detector 325, temperature detection means; and the voltage changing circuit 326, correcting means, respectively.

As described above, according to the present invention, whether the emitting light amount of a flash to the outside of the electronic flash apparatus is controlled or not is determined on the basis of an output set by an external operation member. Therefore, it is possible to conduct a flash photography without adjusting the amount of irradiating light and to perform it as intended by a photographer in accordance with a particular photographing scene.

Also, the response time of light amount adjustment means and the time required from the photographing ready state of a camera to the start of the photographing are compared to determine whether the emitting light amount of a flash to the outside of an electronic flash apparatus is controlled or not. Therefore, it is possible to conduct a flash photography with a rapid shutter speed even if a light amount controlling means such as a liquid crystal or an ECD which has a long response time.

Further, whether the emitting light amount of a flash to the outside of an electronic flash apparatus is controlled or not is determined on the basis of the kind of camera on which the electronic flash apparatus is mounted. Therefore, it is possible to prevent an erroneous operation such as a flash photography being attempted as it is whereas the apparatus is mounted by mistake on a camera which does not respond to the light amount adjustment control.

What is claimed is:

1. A flash lighting apparatus including the following:

a single flashlamp; and a light amount adjustment device arranged to control irradiation of a plurality of areas of a field to be photographed by light from said single flashlamp, said light amount adjustment device having a plurality of emission areas corresponding to different areas of said field, respectively, all of said emission areas being disposed to receive input light from said single flashlamp at the same time, and, while so disposed, each of said emission areas being individually adjustable to vary the amount of light emitted therefrom and thereby to control the amount of irradiation of the corresponding area to a suitable value, which is a value based on distances or positions of at least two objects in said field; and a detection device disposed to detect the distances or positions of the at least two objects in said field, whereby said value is provided.

2. A flash lighting apparatus according to claim 1, wherein light beams emitted through said light amount adjustment device are provided asymmetrically to the optical axis of a camera on which said flash lighting apparatus is mounted.

3. A flash lighting apparatus according to claim 1, wherein said apparatus further includes the following:

a temperature detection portion for detecting temperatures, and a correcting device electrically connected with said temperature detection portion and said light amount adjustment device to correct controlling characteristics of said light amount adjustment device in accordance with temperatures detected by said temperature detection portion.

4. A flash lighting apparatus according to claim 1 further including:

a discriminating device electrically connected with said light amount adjustment device to determine whether the irradiation of said plurality of areas of said field is to be controlled by said light amount adjustment device.

5. A flash lighting apparatus according to claim 4, wherein said discriminating device determines whether said light amount adjustment device controls irradiation of said plurality of areas of said field based on an output set by an external operation member.

6. A flash lighting apparatus according to claim 4, wherein said discriminating device determines whether the irradiation of said plurality of areas of said field is to be controlled by said light amount adjustment device based on whether the time between attainment of a photographing ready state and start of photographing is shorter than a predetermined time.

7. A flash lighting apparatus according to claim 4, wherein said discriminating device makes a judgement based on the kind of a camera on which said flash lighting apparatus is mounted.

8. A flash lighting apparatus including the following:

a single flashlamp;

a light amount adjustment device arranged to control irradiation of a plurality of areas of a field to be photographed by light from said single flashlamp, said light amount adjustment device having a plurality of emission areas corresponding to different areas of said field, respectively, all of said emission areas being disposed to receive input light from said single flashlamp at the same time, and, while so disposed, each of said emission areas being individually adjustable to vary the amount of light emitted therefrom and thereby to adjust the amount of irradiation of each of at least two objects in the field;

a detection device disposed to detect distances or positions of the at least two objects; and a control device electrically connected with said light amount adjustment device and said detection device to control said light amount adjustment device based on detection by said detection device to make the amount of irradiation of each object suitable.

9. A flash lighting system including the following:

a single flashlamp for emitting flash light toward a field;

a light shielding device fixed in position between the field and said flashlamp to receive input light from said flashlamp and, while so fixed in position, being adjustable to vary an amount of light emitted therefrom toward each of at least two objects in the field by shielding light from said flashlamp toward the respective objects substantially completely;

a photometric device disposed to measure photometrically the light which is emitted from said flashlamp and reflected from said at least two objects; and a control device electrically connected with said light shielding device and said photometric device to control said light shielding device to make the amount of irradiation of each object suitable based on photometric measurement by said photometric device.

10. A flash lighting system according to claim 9, wherein said light shielding device has a plurality of light shielding portions corresponding to a plurality of predetermined areas of a field, each of said plurality of light shielding portions shielding light emitted from said flashlamp, said photometric device divides the field into plural photometric areas to measure amounts of light reflected from said predetermined areas, respectively, and said control device outputs discrete light shielding signals to said plural light shielding portions, respectively, when amounts of reflected light measured from said predetermined areas, respectively, reach a predetermined value.

11. A flash lighting system according to claim 10, wherein said plural photometric areas are the same in divided shape as said plural predetermined areas.

12. A flash lighting apparatus including the following:

a single flashlamp for emitting flash light toward a field;

a light shielding device fixed in position between the field and said flashlamp to receive input light from said flashlamp and, while so fixed in position, being adjustable to vary an amount of light emitted therefrom toward each of at least two objects in the field by shielding light from said flashlamp toward the respective objects substantially completely;

a photometric device disposed to measure photometrically the light which is emitted from said flashlamp and reflected from said at least two objects; and a control device electrically connected with said light shielding device and said photometric device to control said light shielding device to make the amount of irradiation of each object suitable based on photometric measurement by said photometric device.

13. A flash lighting apparatus according to claim 12, wherein said light shielding device has a plurality of light shielding portions corresponding to a plurality of predetermined areas of a field, each of said plurality of light shielding portions shielding light emitted from said flashlamp, said photometric device divides the field into plural photometric areas to measure amounts of light reflected from said predetermined areas, respectively, and said control device outputs discrete light shielding signals to said plural light shielding portions, respectively, when amounts of reflected light measured from said predetermined areas, respectively, reach a predetermined value.

14. A flash lighting apparatus according to claim 13, wherein said plural photometric areas are the same in divided shape as said plural predetermined areas.

15. A camera including the following:

a single flashlamp for emitting flash light toward a field;

a light shielding device fixed in position between the field and said flashlamp to receive input light from said flashlamp and, while so fixed in position, being adjustable to vary an amount of light emitted therefrom toward each of at least two objects in the field by shielding light from said flashlamp toward the respective objects substantially completely;

a photometric device disposed to measure photometrically the light which is emitted from said flashlamp and reflected from said at least two objects; and a control device electrically connected with said light shielding device and said photometric device to control said light shielding device to make the amount of irradiation of each object suitable based on photometric measurement by said photometric device.

16. A camera according to claim 15, wherein said light shielding device has a plurality of light shielding portions corresponding to a plurality of predetermined areas of a field, each of said plurality of light shielding portions shielding light emitted from said flashlamp, said photometric device divides the field into plural photometric areas to measure amounts of light reflected from said predetermined areas, respectively, and said control device outputs discrete light shielding signals to said plural light shielding portions, respectively, when amounts of reflected light measured from said predetermined areas, respectively, reach a predetermined value.

17. A camera according to claim 16, wherein said plural photometric areas are the same in divided shape as said plural predetermined areas.

18. An apparatus including the following:

a single flashlamp for emitting flash light toward a field;

an adjustment device fixed in position between the field and said flashlamp to receive input light from said flashlamp and, while so fixed in position, being adjustable to vary an amount of light emitted therefrom toward each of at least two objects in the field;

a photometric device disposed to measure photometrically the amounts of light emitted from said flashlamp and reflected by the at least two objects, respectively; and a control device electrically connected with said adjustment device and said photometric device to control said adjustment device to make the amount of irradiation of each object suitable based on the respective amount of light measured by said photometric device.

19. A flash lighting apparatus including the following:

a single flashlamp; and a light amount adjustment device arranged to control irradiation of a plurality of areas of a field to be photographed by light from said single flashlamp, said light amount adjustment device having a plurality of emission areas corresponding to different areas of said field, respectively, all of said emission areas being disposed to receive input light from said single flashlamp at the same time, and, while so disposed, each of said emission areas being individually adjustable to vary the amount of light emitted therefrom and thereby to control the amount of irradiation of the corresponding area to a suitable value, which is a value based on distances or positions of at least two objects in said field, wherein said flash lamp conducts a preliminary light emission and a regular light emission, said apparatus includes a photometric device disposed to measure photometrically reflected light from said field when said preliminary light emission is conducted, and said light amount adjustment device controls amounts of irradiation of said plurality of areas of said field based on the photometric measurement result of said photometric device at the time of said regular light emission.

20. A flash lighting apparatus according to claim 19, wherein said photometric device conducts photometric measurements for each of said plurality of areas of said field, and said light amount adjustment device controls the amount of irradiation of said plurality of areas of said field based on the photometric measurement results for the corresponding areas, respectively.

21. A flash lighting apparatus including the following:

a single flashlamp for emitting flash light;

a light amount control device arranged in front of said flashlamp to control the amount of said flash light emitted to the outside of said flash lighting apparatus; and a discriminating device electrically connected with said light amount control device to determine whether the emitted light amount is to be controlled by said light amount control device or not, wherein said discriminating device determines whether the emitted light amount is to be controlled by said light amount control device based on whether the time between attainment of a photographing ready state and start of photographing is shorter than a predetermined time.

22. A flash lighting apparatus including the following:

a single flashlamp for emitting flash light;

a light amount control device arranged in front of said flashlamp, said light amount control device being divided into plural light amount controlling areas corresponding, respectively, to plural irradiation areas in a field, each of said plural light amount controlling areas controlling light emitted from said flashlamp, said light amount control device making an amount of irradiation of each of at least two objects in the field suitable by varying an amount of light passing through each light amount controlling area; and a discriminating device electrically connected with said light amount control device to determine whether the emitted light amount is to be controlled by said light amount control device or not, wherein said apparatus further includes the following:

a temperature detection portion for detecting temperatures, and a correcting device electrically connected with said temperature detection portion and said light amount control device to correct controlling characteristics of said light amount control device in accordance with temperatures detected by said temperature detection portion.

23. A flash lighting apparatus including the following:

a single flashlamp for emitting flash light; and a light amount adjustment device arranged to control irradiation of a plurality of areas of a field to be photographed by light from said single flashlamp, said light amount adjustment device having a plurality of emission areas corresponding to different areas of said field, respectively, all of said emission areas being disposed to receive input light from said single flashlamp at the same time, and, while so disposed, each of said emission areas being individually adjustable to vary the amount of light emitted therefrom and thereby to control the amount of irradiation of the corresponding area to a suitable value, wherein said apparatus includes a photometric device disposed to measure photometrically reflected light from said field when said flashlamp emits light, and said light amount adjustment device controls an amount of irradiation of each of said plurality of areas of said field based on photometric measurement by said photometric device when said flashlamp emits light.

* * * * *